US012688075B2

(12) United States Patent
Kang et al.

(10) Patent No.: US 12,688,075 B2
(45) Date of Patent: Jul. 21, 2026

(54) GRAPH PARTITIONING AND IMPLEMENTATION OF LARGE MODELS ON TENSOR STREAMING PROCESSORS

(71) Applicant: Groq, Inc., Mountain View, CA (US)

(72) Inventors: Kyeong Mo Kang, Mississauga (CA); Yuxi Cai, Toronto (CA); Naif Tarafdar, Toronto (CA); Andrew Chaang Ling, Toronto (CA); Pao-Sheng Chou, Toronto (CA)

(73) Assignee: Groq, Inc., San Jose, CA (US)

( * ) Notice: Subject to any disclaimer, the term of this patent is extended or adjusted under 35 U.S.C. 154(b) by 411 days.

(21) Appl. No.: 18/325,647

(22) Filed: May 30, 2023

(65) Prior Publication Data

US 2023/0385125 A1     Nov. 30, 2023

Related U.S. Application Data

(60) Provisional application No. 63/346,574, filed on May 27, 2022.

(51) Int. Cl.
G06F 9/50          (2006.01)

(52) U.S. Cl.
CPC .......... G06F 9/5077 (2013.01); G06F 9/5072 (2013.01)

(58) Field of Classification Search
CPC ......... G06F 9/5077; G06F 9/5072; G06F 8/41
See application file for complete search history.

(56) References Cited

U.S. PATENT DOCUMENTS

| | | | | |
|---|---|---|---|---|
| 8,375,374 B2 * | 2/2013 | O'Brien | ................. | G06F 8/456 |
| | | | | 717/149 |
| 2018/0357047 A1 * | 12/2018 | Brown | ................. | G06N 3/0442 |
| 2021/0382754 A1 * | 12/2021 | Nimmagadda | .......... | G06N 3/08 |
| 2022/0012607 A1 * | 1/2022 | Liu | ........................ | G06F 9/5044 |
| 2022/0092439 A1 * | 3/2022 | Liu | ........................... | G06N 3/08 |
| 2022/0179635 A1 * | 6/2022 | Fang | ........................ | G06N 3/08 |

OTHER PUBLICATIONS

Lianmin Zheng, et al. "Alpa: Automating Inter- and Intra-Operator Parallelism for Distributed Deep Learning" arXiv:2201.12023v3 [cs.LG] Jun. 28, 2022, 20 pages.
Masahiro Tanaka, et al. "Automatic Graph Partitioning for Very Large-scale Deep Learning" http://arxiv.org/abs/2103.16063v1, Mar. 30, 2021, 10 pages.
Deepak Narayanan, et al. "Memory-Efficient Pipeline-Parallel DNN Training" arXiv:2006.09503v3 [cs.LG] Jul. 22, 2021, 14 pages.
Xingeng Xie, et al. "A Transferable Approach for Partitioning Machine Learning Models on Multi-Chip-Modules" arXiv:2112.04041v1 [cs.LG] Dec. 7, 2021, 12 pages.
Colin Unger, et al. "Unity: Accelerating DNN Training Through Joint Optimization of Algebraic Transformations and Parallelization" https://www.cs.cmu.edu/~zhihaoj2/papers/unity_osdi22.pdf, Last Accessed May 26, 2023, 18 pages.
Alice Gatti, et al. "Deep Learning and Spectral Embedding for Graph Partitioning" arXiv:2110.08614v2 [cs.LG] Dec. 8, 2021, 12 pages.

* cited by examiner

*Primary Examiner* — Dong U Kim
(74) *Attorney, Agent, or Firm* — Dority & Manning, P.A.

(57) ABSTRACT

A graph partitioning compiler partitions an AI program or model for execution on multiple TSP modules configured for accelerating deep learning workloads.

20 Claims, 21 Drawing Sheets

1050

1350

1550

| Topology | GPT Variant | Throughput (SPS) | Latency (ms) | Total TSPs |
|----------|-------------|------------------|--------------|------------|
| Dragon Fly | GPT-3 (6.7B) | 13,789 | 9.21 | 64 |
| MCM (Diphda) | GPT-3 13B⁺ | 26,000 | 20 | 256 |

FIG. 15

210
Computer System

212

224
Storage Subsystem

226
Memory Subsystem

228
File Storage Subsystem

230
RAM

232
ROM

222
User Interface Input Devices

220
User Interface Output Devices

216
Network Interface

218
Communication Network

214
Processor(s)

1950

GRAPH PARTITIONING AND IMPLEMENTATION OF LARGE MODELS ON TENSOR STREAMING PROCESSORS

BENEFIT OF THE PRIOR FILING DATE

The present application claims the benefit of the filing date of the provisional U.S. Application No. 63/346,574, entitled "GRAPH PARTITIONING ALGORITHMS AND IMPLEMENTATION PLAN FOR TENSOR STREAMING PROCESSORS" and filed on May 27, 2022, the entirety of which is expressly incorporated herein by reference.

COPYRIGHT NOTICE

SPECIFICATION—DISCLAIMERS

In the following Background, Summary, and Detailed Description, paragraph headings are signifiers that do not limit the scope of an embodiment of a claimed invention Extended Care Information Network (embodiments of a claimed invention). The citation or identification of any publication signifies neither relevance nor use as prior art. A writing enclosed in double quotes (" ") signifies an exact copy of a writing that has been expressed as a work of authorship. Signifiers, such as a word or a phrase enclosed in single quotes (' '), signify a term that as of yet has not been defined and that has no meaning to be evaluated for, or has no meaning in that specific use (for example, when the quoted term 'module' is first used) until defined.

TECHNICAL FIELD

The present disclosure generally relates to compiler operations, and more specifically to graph partitioning of an AI program and implementation on one or more tensor streaming processors.

BACKGROUND

Over the last decade, data center operators have installed multicore processor systems in warehouse-scale computers. These systems have dozens to thousands of processing cores that vary widely in form and function and use powerful graphical processing units (GPUs), tensor processing units (TPUs), field programmable gate arrays (FPGAs), with many using data network controllers for efficient remote memory access. Such systems are often used for accelerating deep neural network training and inference (application of the trained neural network) performance for a wide range of uses in commerce, for example, convolutional neural networks (CNNs) for recommendation algorithms, computer vision and image classification for product searching; and recurrent neural networks (RNNs) for natural language processing in user interfaces and more recently various transformer models. The heightened computational requirements of these models, many of which involve very large numbers of vector and matrix calculations, when used for millions of consumers and billions of transactions, have been the catalyst for a resurgence of architectural innovation.

In a conventional module multiprocessor (CMP), processing cores are interconnected using an on-chip network to exchange data between all of the processing cores. In this simple load-store model, a set of general-purpose data registers are used as intermediate storage between the main memory systems and the processor cores, which can include arithmetic logic units (ALUs), that operate on data. Instructions from an AI program are dispatched to each core and executed by the local integer or floating-point processing modules, while intermediate results are stored in the general-purpose registers. This load-store architecture moves data (also referred to as 'operands') and computed results between the registers and main memory. Instruction execution is often carried out over several stages: 1) instruction fetch, 2) instruction decode, 3) execution on ALUs, 4) memory read, and 5) memory write to update the results in the registers.

However, workloads for CMPs continue to grow both in size and complexity, presenting serious scalability, performance, and usability demands for traditional CMP architectures. Efficiently managing this demand requires architectural enhancements such as caches, branch predictors, and prefetchers to help improve performance, however, they do not bound worst-case performance.

Each processing core has limited resources and modern-day models do not fit on a single processor core. One possible approach to fit a model on a plurality of cores is to use graph partitioning algorithms. Many applications can be represented as a graph with a set of nodes connected by edges. The nodes and edges usually represent computation and communication. Each node and edge can have a weight that represents a particular cost of executing the computation or communication associated with it. In order to efficiently exploit parallelism in AI programs, the model needs to be decomposed among processing elements. To efficiently execute this application on a parallel platform, the computation must be load-balanced and the inter-device communication must be minimized. Graph partitioning may be used to accomplish this task.

Partitioning an AI program to run efficiently on multiple GPU or CPU devices is a complex task and depends on various factors such as the nature of the program, the hardware architecture, and the specific optimization goals. While the exact details can vary between different compilers and frameworks, a general overview of how program partitioning for parallel execution might occur includes the following steps:

Analysis and Profiling: The compiler first analyzes the AI program and performs profiling to understand its computational characteristics, including data dependencies, workload distribution, and performance bottlenecks. This information helps in identifying potential parallelization opportunities.

Task Partitioning: The program is divided into smaller tasks that can be executed concurrently. This partitioning can be based on different criteria, such as splitting the workload across multiple devices, dividing the program into independent subtasks, or applying data parallelism by splitting data across devices.

Dependency Analysis: The compiler identifies dependencies between different tasks or data elements to ensure proper synchronization and order of execution. It determines which tasks can be executed independently and which ones have dependencies that need to be resolved.

Data Distribution: If data parallelism is employed, the compiler determines how to distribute the data across the GPU devices. This can involve partitioning the data into chunks or assigning specific data subsets to different devices to maximize parallelism and minimize data transfers.

Code Generation: The compiler generates code for each partitioned task, taking into account the target GPU architecture and programming model (e.g., CUDA for NVIDIA GPUs). It optimizes the code for parallel execution, vectorization, memory access patterns, and other device-specific considerations.

Synchronization and Communication: The compiler inserts synchronization points and communication mechanisms as necessary to coordinate the execution of parallel tasks and handle data dependencies. This ensures that the results from different tasks are properly combined and synchronized.

Optimization and Tuning: The compiler applies various optimization techniques, such as loop unrolling, memory access optimizations, and kernel fusion, to improve the performance of the generated parallel code. It may also consider trade-offs between load balancing, communication overhead, and data transfer costs to optimize the overall execution.

Deployment and Execution: Once the program is partitioned, optimized, and compiled, it can be deployed and executed on the target GPU or CPU devices. The program and its data are distributed across the devices, and the runtime system or framework manages the parallel execution, data transfers, and synchronization between the devices.

It's important to note that the specific details of program partitioning for parallel execution can vary depending on the compiler, programming model, and target hardware architecture. Different frameworks, such as TensorFlow or PyTorch, may provide their own mechanisms and tools for distributed training or inference, handling many of the complexities involved in partitioning AI programs for parallel execution on multiple GPU and CPU devices. It is also important to note that GPUs and CPUs have access to many banks of external DRAM so memory is rarely a limiting issue for storing copious amounts of weights and activations. Thus, most partitioning efforts are focused on finding opportunities for parallelization which allows for a coarse grain partitioning of an AI program.

While graph partitioning algorithms can map a model onto multiple devices, determining the optimal topology adds complexity compared to mapping a model onto a single device.

SUMMARY

This Summary, together with any Claims, is a brief set of signifiers for at least one embodiments of a claimed invention (extended care information network) (which can be a discovery, see 35 USC 100(a); and see 35 USC 100(j)), for use in commerce for which the Specification and Drawings satisfy 35 USC 112.

The present technology addresses the issue of how to partition a model onto multiple devices. In one embodiment, a graph partitioning algorithm suitable to solve the problem of partitioning a model across a plurality of deterministic processor cores enables a deterministic processor with a small local memory to implement a large language model such as ChatGPT or Llama having billions of parameters with low latency and high throughput.

BRIEF DESCRIPTION OF THE DRAWINGS

The following Detailed Description, Figures, and Claims signify the uses of, and progress enabled by one or more embodiments of a claimed invention. All the Figures are used only to provide knowledge and understanding and do not limit the scope of any embodiments of a claimed invention. Such Figures are not necessarily drawn to scale.

The Figures can have the same, or similar, reference signifiers in the form of labels (such as alphanumeric symbols, e.g., reference numerals), and can signify a similar or equivalent function or use. Further, reference signifiers of the same type can be distinguished by appending to the reference label a dash and a second label that distinguishes among the similar signifiers. If only the first label is used in the Specification, its use applies to any similar component having the same label irrespective of any other reference labels. A brief list of the Figures is below.

FIG. 15 depicts the results of a GroqRack executing a GPT model in accordance with sore embodiments.

Figure 1:
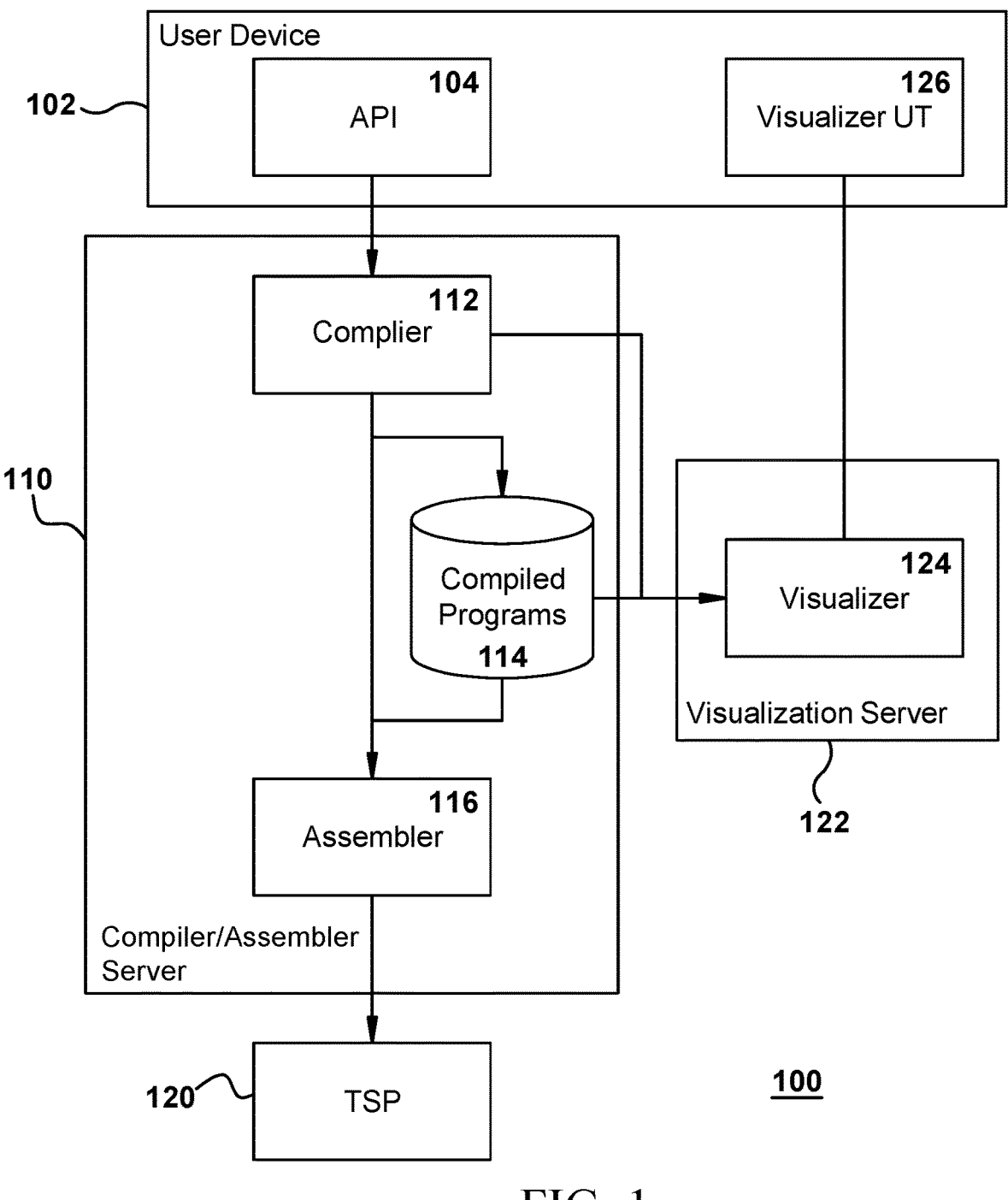
FIG. 1 depicts a system for compiling programs to be executed on a tensor processor.

In the Figures, reference signs can be omitted as is consistent with accepted engineering practice; however, a skilled person will understand that the illustrated components are understood in the context of the Figures as a whole, of the accompanying writings about such Figures, and of the embodiments of the claimed inventions.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The Figures and Detailed Description, only to provide knowledge and understanding, signify at least one embodiment of a claimed invention. To minimize the length of the Detailed Description, while various features, structures or characteristics can be described together in a single embodiment, they also can be used in other embodiments without being written about. Variations of any of these elements, and modules, processes, machines, systems, manufactures, or compositions disclosed by such embodiments and/or examples are easily used in commerce. The Figures and Detailed Description signify, implicitly or explicitly, advantages and improvements of at least one embodiment of a claimed invention for use in commerce. In the Figures and Detailed Description, numerous specific details can be described to enable at least one embodiment of a claimed invention. Any embodiment disclosed herein signifies a tangible form of a claimed invention. To not diminish the significance of the embodiments and/or examples in this Detailed Description, some elements that are known to a skilled person can be combined for presentation and for illustration purposes and not be specified in detail. To not diminish the significance of these embodiments and/or examples, some well-known processes, machines, systems, manufactures, or compositions are not written about in detail. However, a skilled person can use these embodiments and/or examples in commerce without these specific details or their equivalents. Thus, the Detailed Description focuses on enabling the inventive elements of any embodiments of a claimed invention. Where this Detailed Description refers to some elements in the singular tense, more than one element can be depicted in the Figures and like elements are labeled with like numerals.

The terms "AI program" and "AI model" refer to different aspects of artificial intelligence. An AI program, also known as an AI application, AI software or simply a program, refers to the software implementation that incorporates artificial intelligence techniques to perform specific tasks or solve problems. It encompasses the entire codebase, algorithms, and logic that enable an AI system to carry out intelligent functions. A program typically includes data processing, feature extraction, training algorithms, decision-making processes, and any other components necessary for the AI system to accomplish its intended purpose. The AI system is the combination of the program and the model deployed on a host computer and an accelerator processor which in a preferred embodiment is a tensor streaming processor.

An AI model, also referred to as a machine learning model, as a deep learning model or simply as a model, is a mathematical representation or structure that has been trained on data to make predictions or decisions. It is the core component of an AI program that encapsulates the knowledge learned from the training data. An AI model consists of layers, nodes, weights, and activation functions that enable it to process inputs and produce outputs. The model is trained using various machine learning techniques to learn patterns, correlations, and rules from the data, allowing it to make predictions or classifications on previously unseen inputs.

In summary, the AI program is the broader software implementation that encompasses the entire codebase and logic, while a model is a specific component within the program that has been trained on data and has the ability to make predictions or decisions based on that training. The program utilizes one or more models to achieve its desired functionality.

FIG. 1 illustrates a system 100 for compiling models to be executed on a tensor processor, according to an embodiment. The system 100 includes a user device 102, a server 110, and a processor 120. Each of these components, and their sub-components (if any) are described in greater detail below. Although a particular configuration of components is described herein, in other embodiments the system 100 may have different components and these components perform the functions of the system 100 in a different order or using a different mechanism. For example, while FIG. 1 illustrates a single server 110, in other embodiments, compilation, assembly, and power usage functions are performed on different devices. For example, in some embodiments, at least a portion of the functions performed by the server 110 are performed by the user device 102.

The user device 102 comprises any electronic computing device, such as a personal computer, laptop, or workstation, which uses an Application Program Interface (API) 104 to construct programs to be run on the processor 120. The server 110 receives a program specified by the user at the user device 102 and compiles the program to generate a compiled program 114. In some embodiments, a compiled program 114 enables a data model for predictions that processes input data and makes a prediction from the input data. Examples of predictions are category classifications made with a classifier, or predictions of time series values. In some embodiments, the prediction model describes a machine learning model that includes nodes, tensors, and weights.

In one embodiment, the model is specified as a TensorFlow model, the compiler 112 is a TensorFlow compiler and the processor 120 is a tensor processor. In another embodiment, the prediction model is specified as a PyTorch model, the compiler is a PyTorch compiler. In other embodiments, other machine learning specification languages and compilers are used. For example, in some embodiments, the prediction model defines nodes representing operators (e.g., arithmetic operators, matrix transformation operators, Boolean operators, etc.), tensors representing operands (e.g., values that the operators modify, such as scalar values, vector values, and matrix values, which may be represented in integer or floating-point format), and weight values that are generated and stored in the model after training. In some embodiments, where the processor 120 is a tensor processor having a functional slice architecture, the compiler 112 generates an explicit plan for how the processor will execute the program, by translating the program into a set of operations that are executed by the processor 120, specifying when each instruction will be executed, which functional slices will perform the work, and which stream registers will hold the operands. This type of scheduling is known as "deterministic scheduling". This explicit plan for execution includes information for explicit prediction of excessive power usage by the processor when executing the program.

The assembler 116 receives compiled programs 114, generated by the compiler 112, and performs final compilation and linking of the scheduled instructions to generate a compiled binary. In some embodiments, the assembler 116 maps the scheduled instructions indicated in the compiled program 112 to the hardware of the server 110, and then determines the exact component queue in which to place each instruction.

The processor 120, e.g., is a hardware device with a massive number of matrix multiplier units that accepts a compiled binary assembled by the assembler 116, and executes the instructions included in the compiled binary. The processor 120 typically includes one or more blocks of circuitry for matrix arithmetic, numerical conversion, vector computation, short-term memory, and data permutation/ switching. Once such processor 120 is a tensor processor having a functional slice architecture. In some embodiments, the processor 120 comprises multiple tensor processors connected together. System 100 may further include a visualization server 122 that includes a visualizer program 124 for visualizing the deterministic operation of processor 120. The output of the visualizer program 124 is displayed on Visualizer UI 126. The visualization server 122 is useful for debugging purposes.

When the TSP compiler receives a large model having more weights than the available memory on the TSP, the compiler needs to determine how to allocate the model across the available TSP modules.

Figure 2:
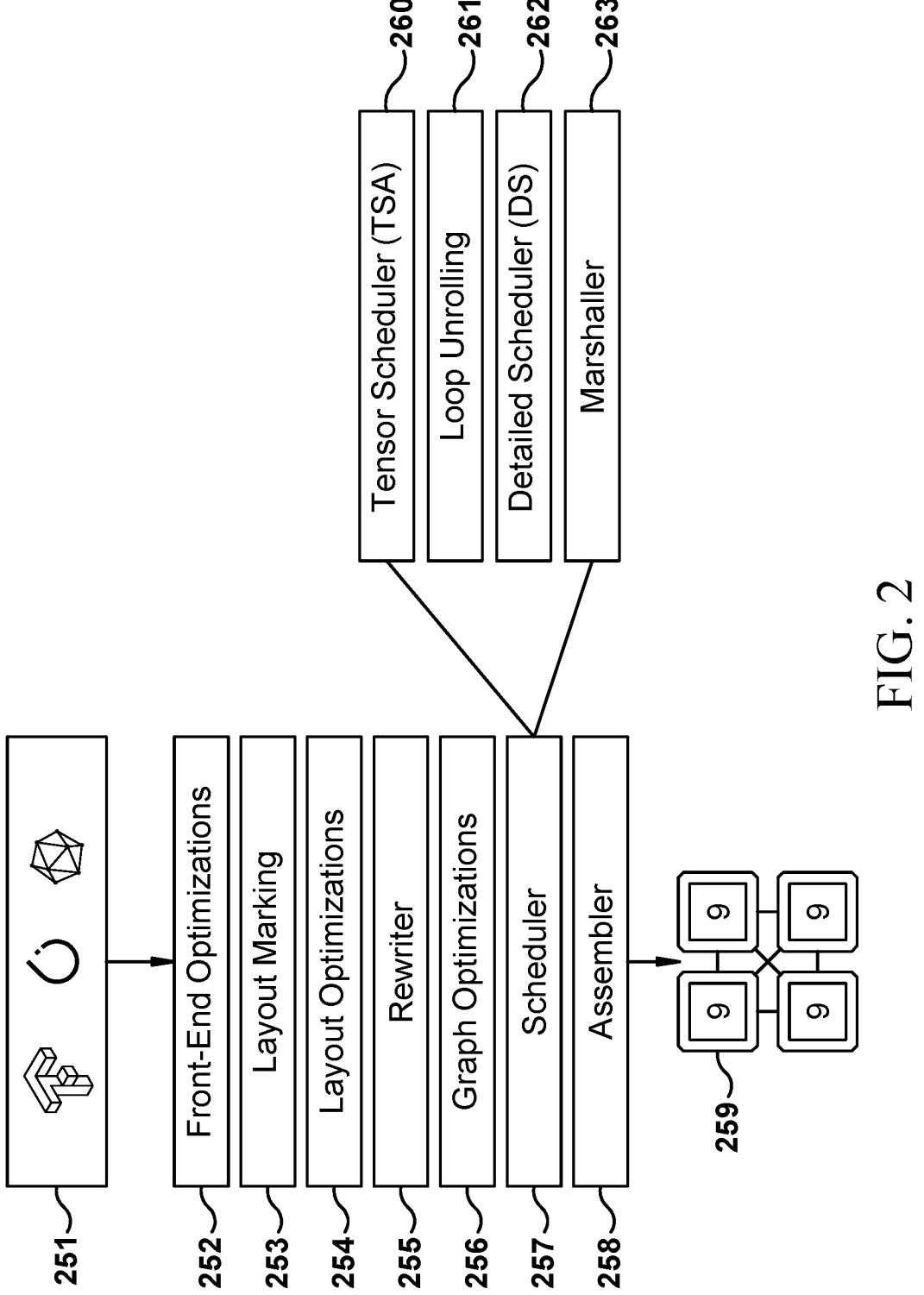
FIG. 2 depicts a deterministic compiler structure for compiling programs and models to execute on a target processor in accordance with some embodiments.

The compiler 112 stages are shown in FIG. 2. Before a graph of the model can be constructed the compiler must use the information obtained from control flow and data dependency analysis of the AI program or model to transform it from a first language (e.g., PyTorch or TensorFlow) into a second language referred to as an intermediate representation (IR) which is a slightly abstracted version of the original model. Tensorflow to Front end optimizations that rewrites the model into an intermediate representation (IR) with GTensorOps or GTen, a language that the device can support. A graph is then generated that represents the model's operations.

After the IR transformation, the compiler can construct a graph representation of the program's computation flow. This graph typically represents operations as nodes and their dependencies as edges. Each node may include information such as the type of operation, input and output variables, and other relevant attributes.

Once the graph representation is constructed, the compiler can apply additional optimization techniques to improve the program's performance. This may involve transformations such as loop unrolling, constant folding, common subexpression elimination, and others.

Layout marking then vectorizes the tensor operations. This puts the model into a format that can be compiled for the target module which in the preferred embodiments is a vector processing device. Layout optimization can occur once the basic storage plan for the model is known.

Since the preferred device operates on vectors, the IR must be rewritten to vector operations. The rewriter takes it from the GTen IR (tensor) to a more device specific language where operations correspond to vector ops that match the available resources (like MXM, SXM or VXM on the TSP).

Once the model has been rewritten in an appropriate format, the compiler does additional vector level optimization and then schedules. Scheduling allocates vectors onto memory and schedules various ops at the functional units on the modules.

Figure 3:
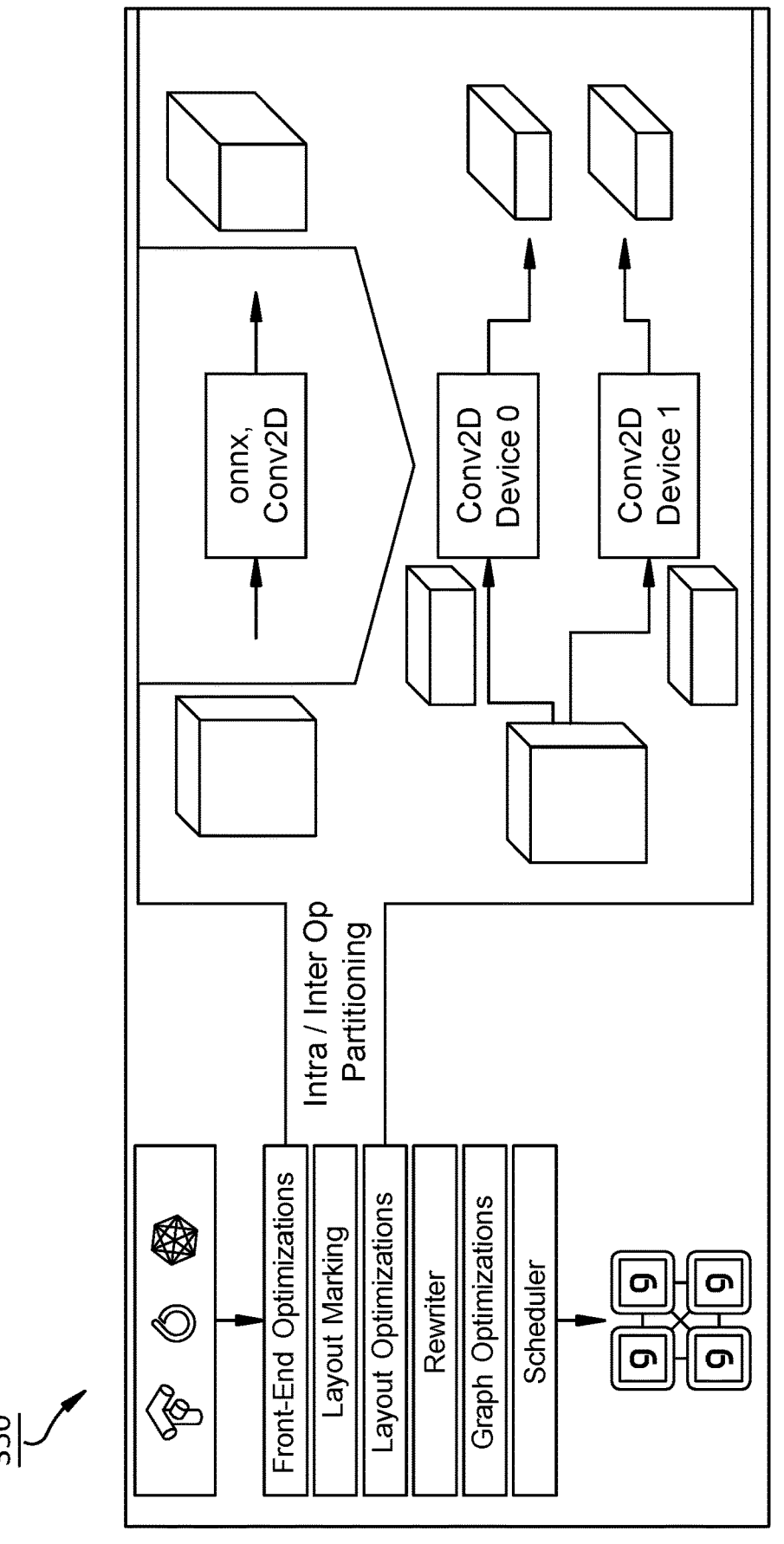
FIG. 3 depicts the deterministic compiler further comprising a method for partitioning an intermediate representation of the program and model to enable partitioning in accordance with some embodiments.

Refer now to FIG. 3. In one embodiment, partitioning occurs across three of the compiler stages—Front End Optimization, Layout Marking and Layout Optimization. Partitioning occurs at these early compiler stages because information is lost the further down the compiler process flow and after the front end optimizations, there is still sufficient 'big picture' visibility of the program functions. Thus, by partitioning at an intermediate tensor level, sufficient relative accuracy is maintained as well as the live state of the tensor that provides vectorization information even though, at this stage of the compilation process, they are still kept as tensors.

Partitioning has two main parts and is preferably first done at the tensor op level. The first two partitioning parts comprise interop partitioning and intra op partitioning.

In a first step, the partitioning process comprises slicing the graph and keeping the Tensor ops intact and just slicing the tensor ops to determine which module the operation will execute on.

Intra-op is not so much about splitting up the graph but rather slicing the operations to determine how many modules are going to be used to run the op. For example, a convolution of a tensor may be split to run on two different modules.

Figure 4:
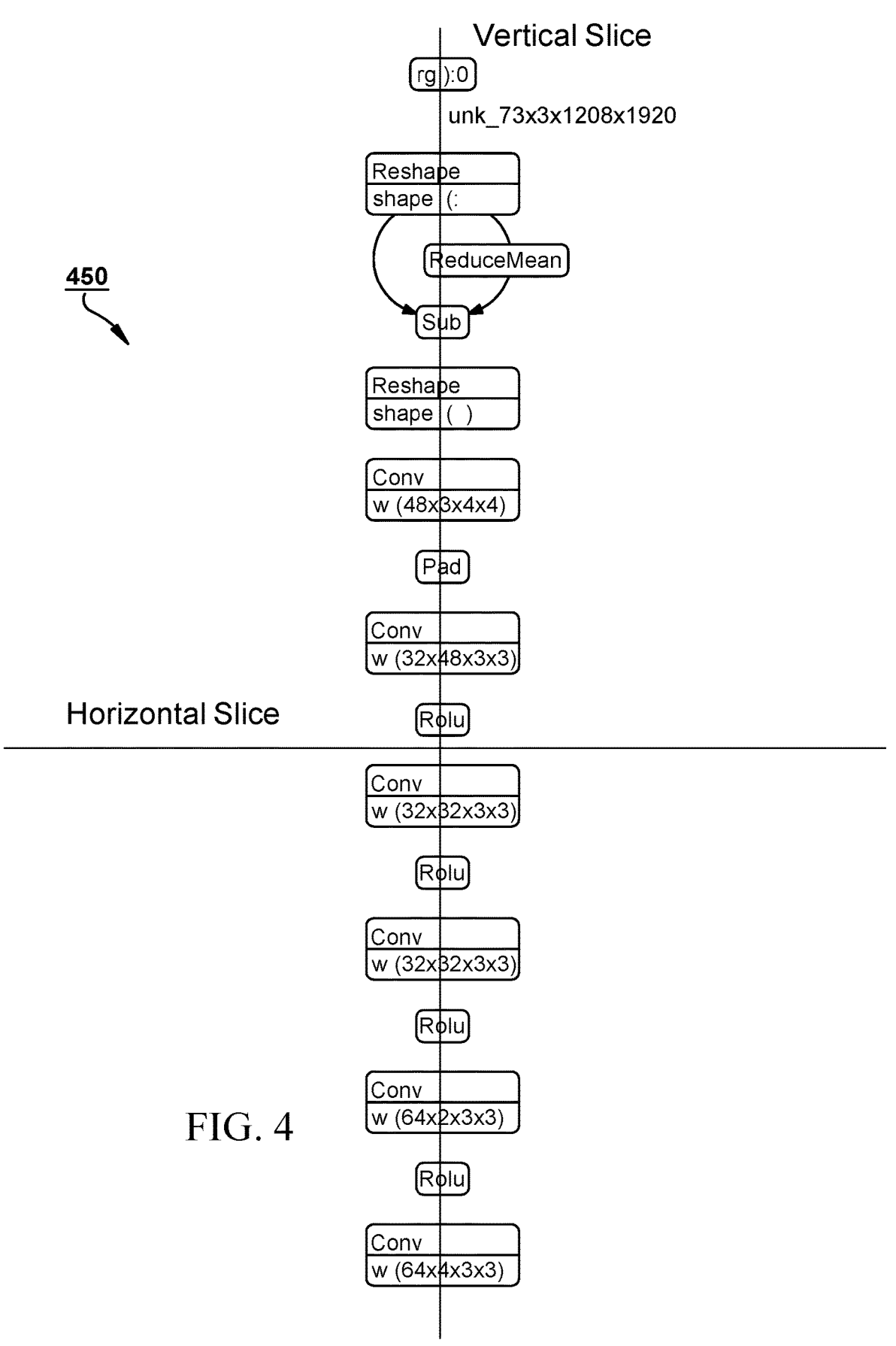
FIG. 4 depicts a graph of a program having vertical slice and horizontal slice in accordance with some embodiments.

FIG. 4 depicts the various approaches to partitioning the program graph in a preferred embodiment. Here a horizontal slice is shown partitioning the graph into two subgraphs. The vertical slice is shown to illustrate how each instruction can be partitioned into two or more subgraphs. It is to be understood that each subgraph is sized to enable it to fit on a single TSP module. It is to be further understood that each subgraph may be further partitioned as part of an optimization process to improve throughput, latency or to reduce power.

Figure 5A:
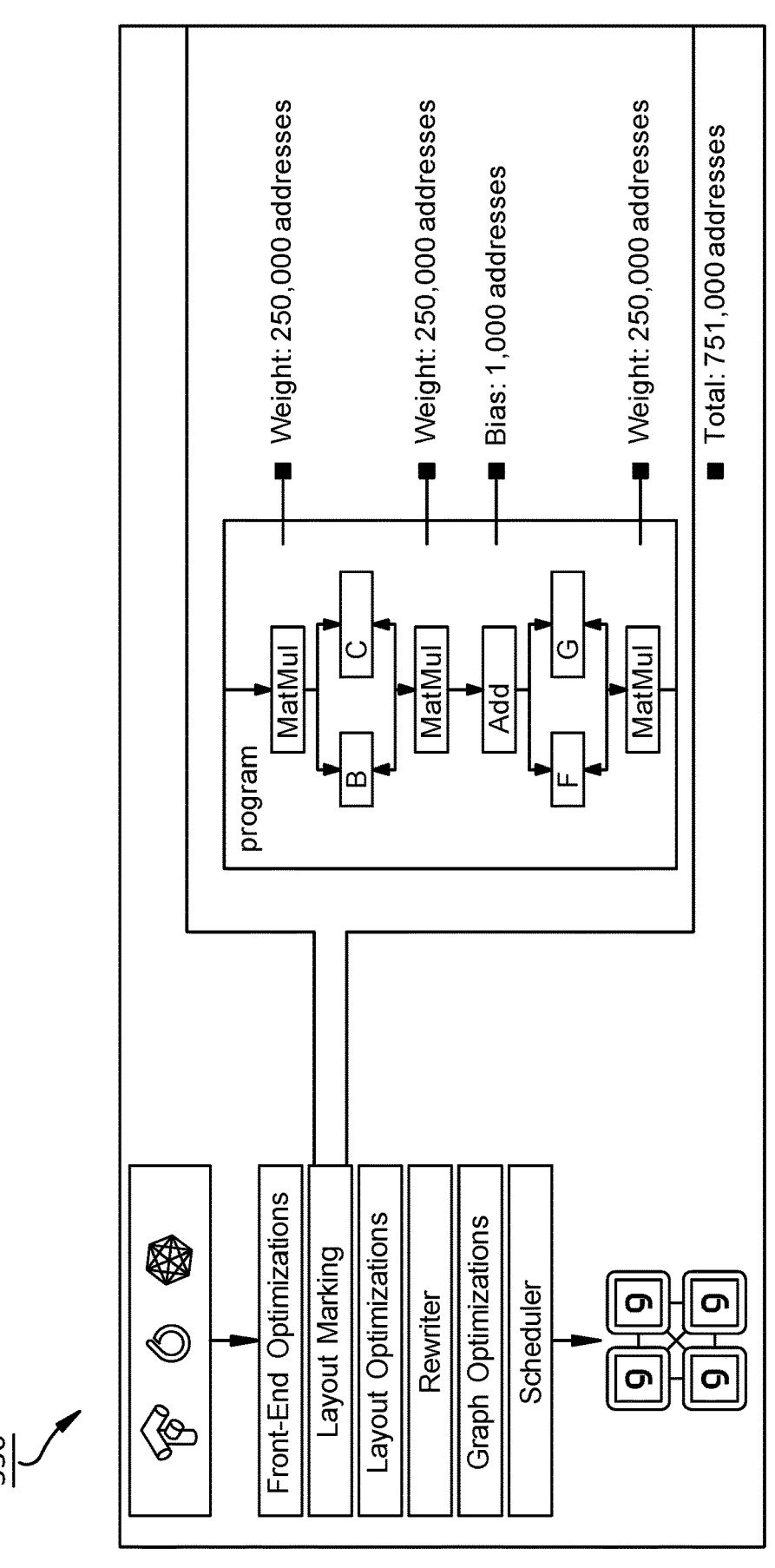
FIGS. 5A and 5B depict a first method for partitioning a graph for a target processor in accordance with some embodiments.

FIG. 5A shows a graph after the front-end optimization compilation step. In this portion of an illustrated program graph 555, there are three Matmul operations 557A, 557B and 557C, several unary operations 558A, 558B, 558C and 558D and a binary operation 559. At this level of the compilation process, the set of constants that comprise weights and bias addresses that exist in this graph are exposed and which indicate how many addresses will be required to execute the model. In this example illustration, 751,000 addresses will be required to instantiate the model. In order to instantiate the model on a single module, it must have more than 751,000 memory addresses plus additional storage for intermediate and final results and model instructions. For modules that have less than the required minimum addresses, it is necessary to partition the model to provide adequate addresses. For example, the TSP has 720,856 addresses so this model will not fit on a single TSP.

Figure 5B:
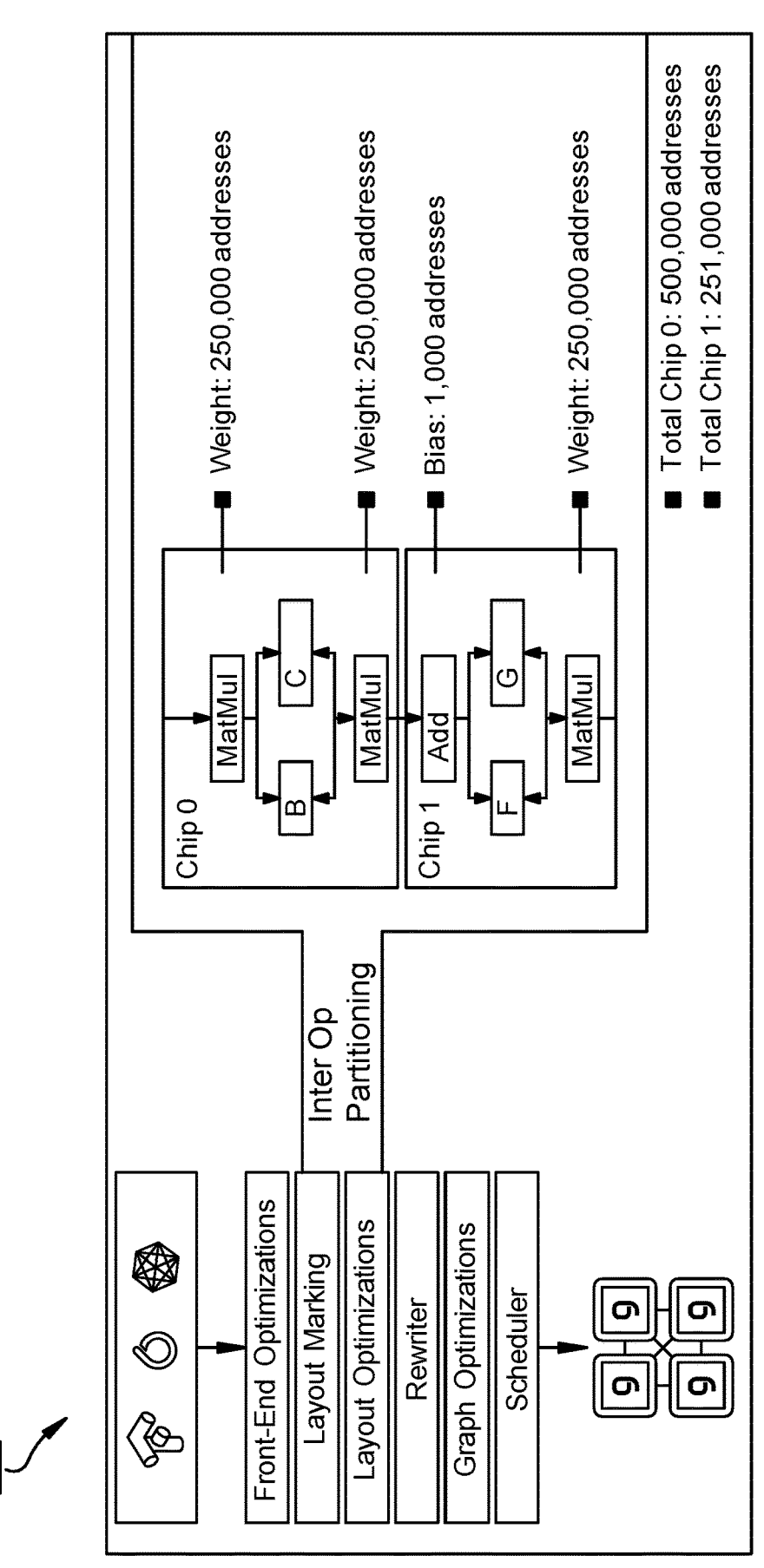

It is possible to partition the graph in a simplistic inter op partitioning, as depicted in FIG. 5B. In this example, the first two Matmuls operations execute on a first module and the third Matmul operation executes on a second module. With such a partition, module 1 560 has 500,000 addresses and module 2 561 has 251,000 addresses. This inter op partitioning process partitions the model across many modules and enables the compilation of models having "many weights" that exceeds the capacity of a signal module. The inter op partitioning (horizontal partitioning) enables transformer models such as Bert Large and GPT3/Facebook OPT to be compiled.

Figure 6A:
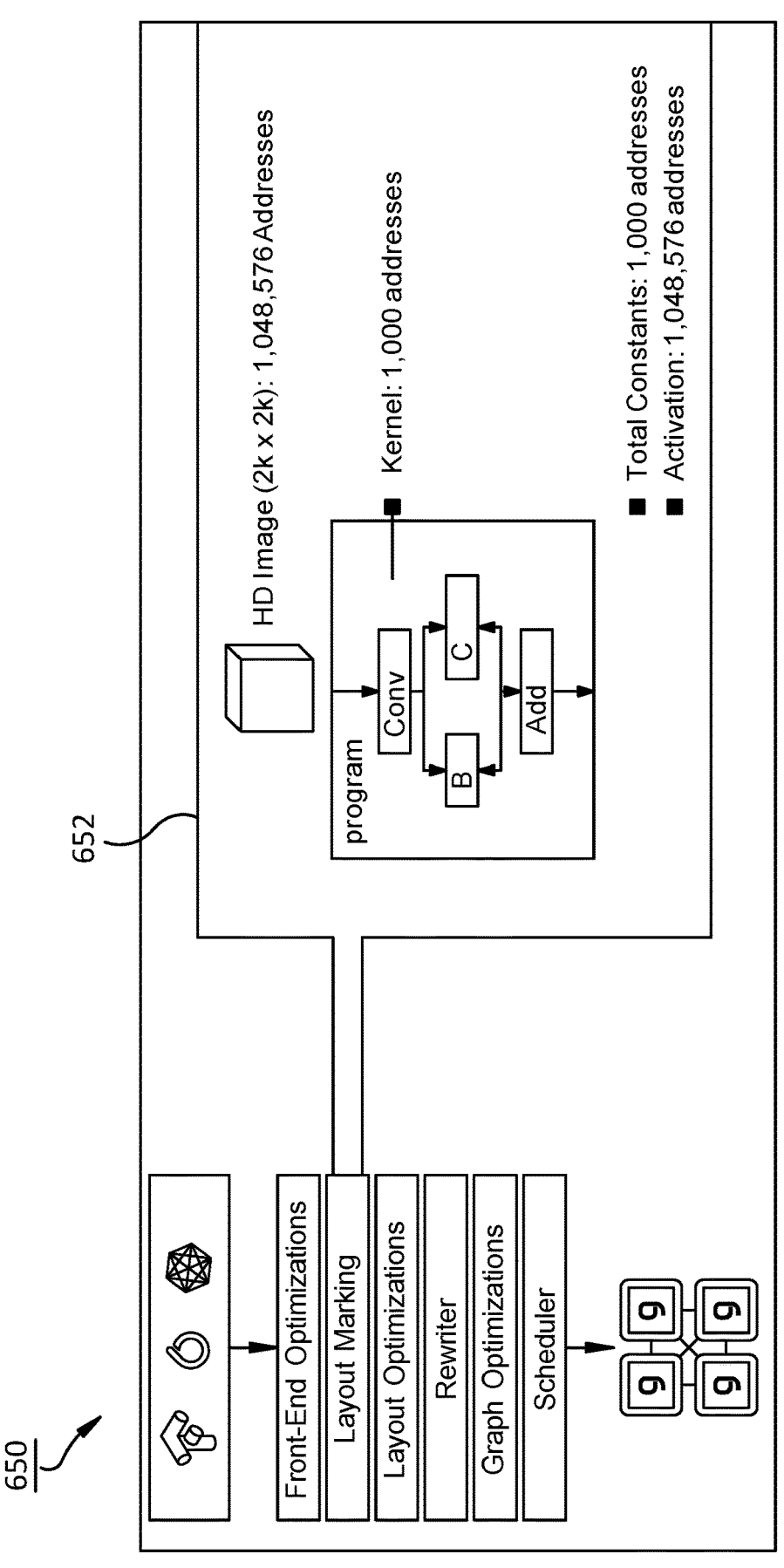
FIGS. 6A and 6B depict a method for partitioning a large model using a second method in accordance with some embodiments.

Referring now to FIG. 6 which depicts partitioning at the layout marking level 253. In this example, the model comprises a High-Definition image requiring over 1.048 million activation addresses (2K pixels×2K pixels×3 planes×2 bytes per pixel) and an additional 1,000 addresses for a convolution kernel. The program graph illustrated at 652 the model graph as comprising the convolution, two unary operations and an Add operation.

Figure 6B:
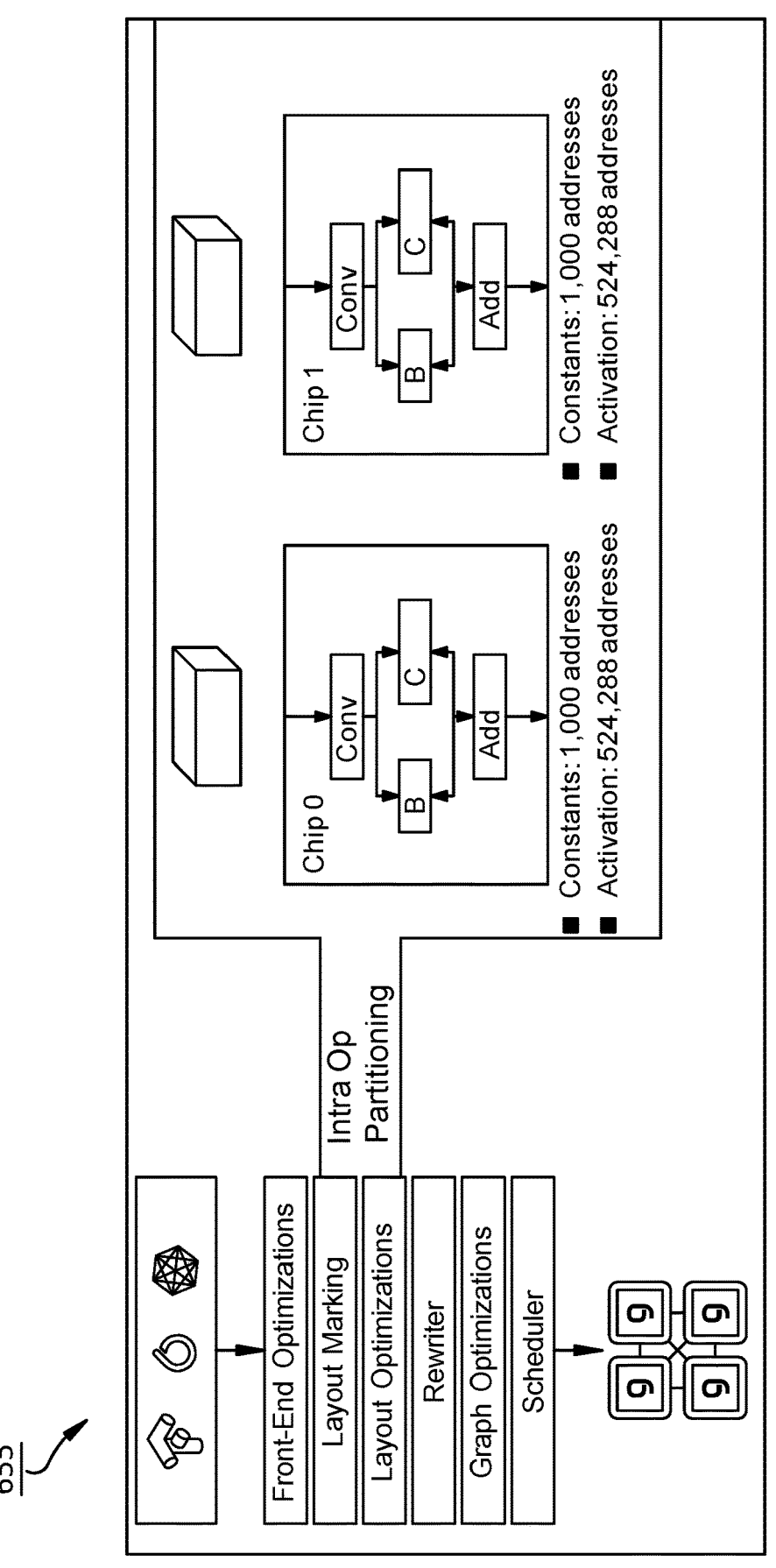

FIG. 6B depicts an intra op partition where a single tensor op is split across more than one module to gain additional memory addresses. In this example, both module 0 and module 1 store 1,000 constant addresses and 524,288 activation addresses. By partitioning the tensor, each module is now working on half the convolution but needs only store a portion of the weights. Intra op partitioning enables compilation of models with large tensors. The intra op partition slices a large tensor op to run on multiple modules. The intra op partitioning (vertical partitioning) enables models such as Resnet HD 2 k×2 k and StyleGan to be compiled.

The compiler performs both inter op and intra op partitioning in a single pass to ensure that the peak live state address usage on each module never exceeds the available address memory.

Figure 7:
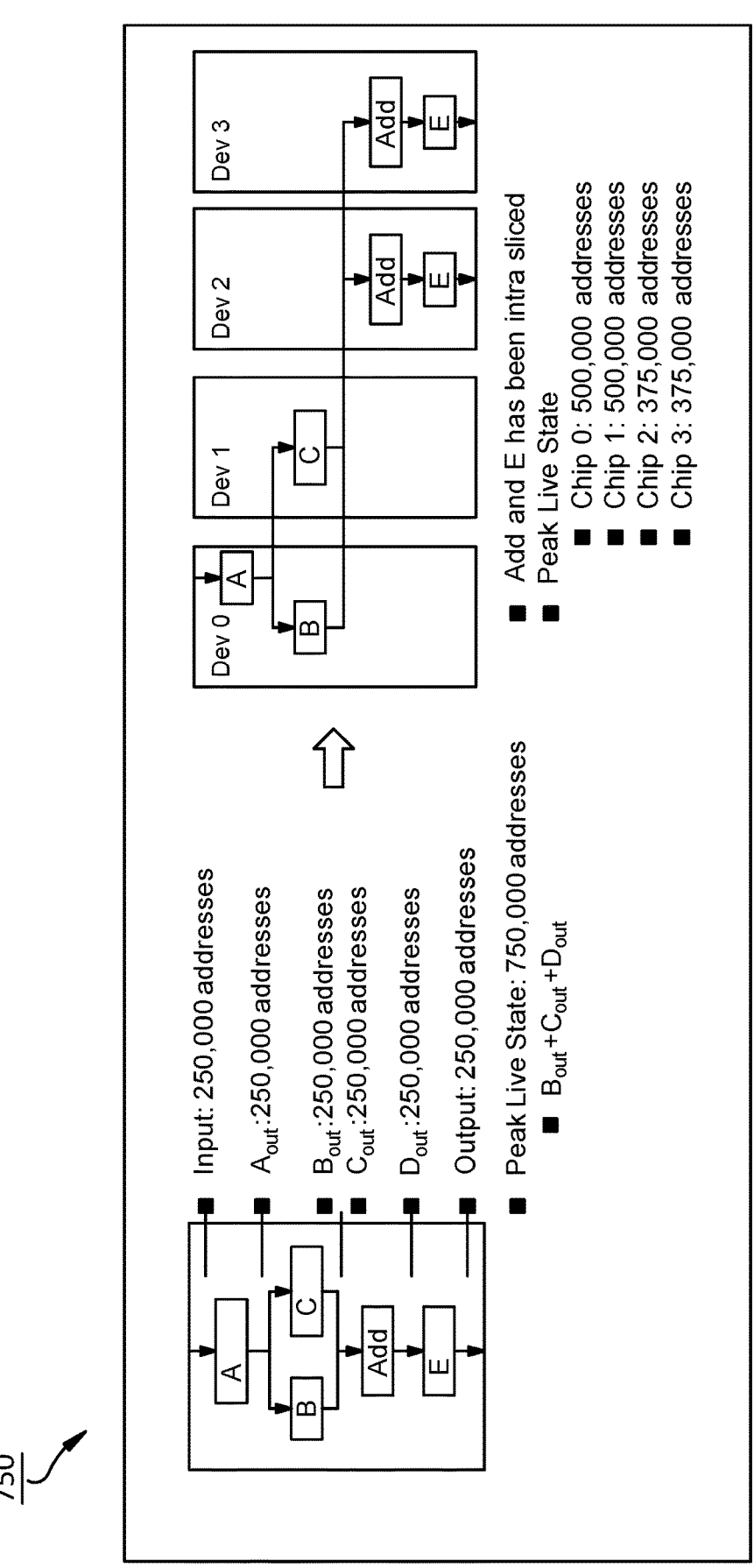
FIG. 7 depicts a method for partitioning a large model using a combination of the first and second methods in accordance with some embodiments.

FIG. 7 depicts how the compiler performs both inter ops and intra ops on a program graph to manage memory address usage. In this example, a program graph indicates a peak live state usage of 750,000 addresses. After the horizontal and vertical partitioning among four modules, the peak live state usage drops to 500,000 addresses on modules 0 and 1 and only 375,000 addresses on modules 2 and 3.

The vertical partition between op B and op C is a preferred partition because it reduces the peak live state address usage of B and C by migrating one of the op B or op C to another module.

Figure 8:
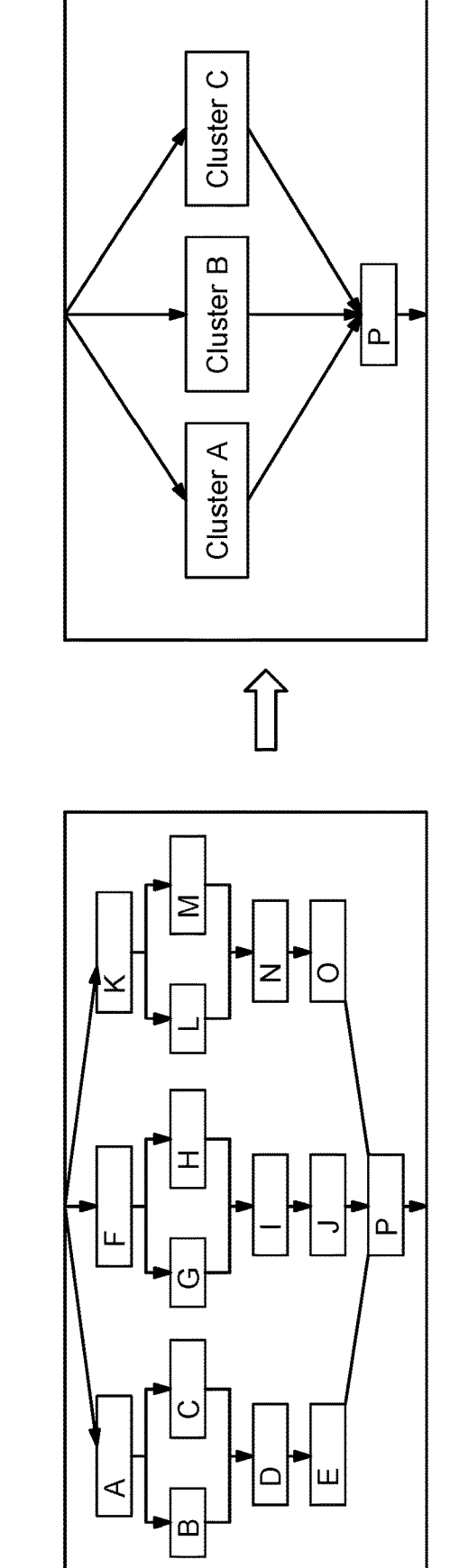
FIG. 8 depicts a method for partitioning a large model using a third method in accordance with some embodiments.

FIG. 8 illustrates yet another partitioning strategy implemented by the compiler which is referred to as "operation clustering". With operation clustering, the compiler looks for opportunities to reduce the graph size to improve fitability by grouping contiguous sets of unary operations into a single cluster. Thus operations A-P, in this example, devolve into three clear clusters A, B and C where Cluster A comprises operations A-E, Cluster B comprises operations F-P and Cluster C comprises clusters K-O. Operation P recombines the intermediate results from each cluster and provides the output to the next operation in the program graph. In some embodiments, each cluster A-C is executed on a different module and recombined on one of the modules or alternatively on a fourth module. Clustering is typically invoked when there is a large fan-out of an input into a plurality of several separate subgraphs. Operation clustering enables models such as Cosmic Tagger to be compiled. Essentially, operation clustering may be combined with inter op slicing and intra op slicing to reduce peak live state address usage on each module.

The compiler may also implement a partitioning process referred to herein as Live State Driven Partitioning. As a general rule, the peak live state address usage is divided by the available address space on a module to arrive at a first number of modules that will be required to compile and execute a model. By deduction, it should be apparent that peak live state address usage simply means that address usage at every edge of a graph or subgraph is compared to the available address storage on a single module at a given point in the graph. If the peak live state (e.g., the number of allocated input and outputs of a node together with intermediate values that cannot be deallocated because such values will be needed by a following operation) is higher than available storage, then a single module would suffer a huge latency hit if weights had to be transferred onto the module during execution. Live State Driven Partitioning enables compilation of models with many parallel live states and provides an automated method of determining the number of devices to use to compile a given model. Since the interface to transfer data to the TSP is relatively very slow, it is preferable to retain all weights on the module before initiating execution. Thus, if the peak live state is less than the available address space, the model can be compiled and executed.

In various embodiments of a claimed invention, the compiler is a deterministic compiler that applies a variety of partitioning schemes utilizing inter op partitioning, intra op partitioning, operation clustering, and Live State Driven Partitioning to fit a model onto one or more deterministic modules. More specifically, in embodiments of a claimed invention, the module is a GroqChip tensor streaming processor that are tightly interconnected by the C2C interface and scheduled together as a cohesive single core. It is important to understand that the modules of the preferred embodiment are scheduled together as a single core. When data is available on one module and needs to be used in one or more other modules, the compiler can immediately schedule the data transfer to the subsequent module or modules with cycle by cycle accuracy. Since the compiler can schedule literally thousands of modules in parallel to other modules, there is no need to wait for an entire tensor to be ready before the results are transported to the next module or modules. Rather the compiler can schedule a vector to start moving to a next module which can then start executing on it. The tight scheduling for some of the larger graphs where activations are rather large, the compiler may effectively parallel execution and thereby significantly lower latency and costs for generating an output.

Figure 9:
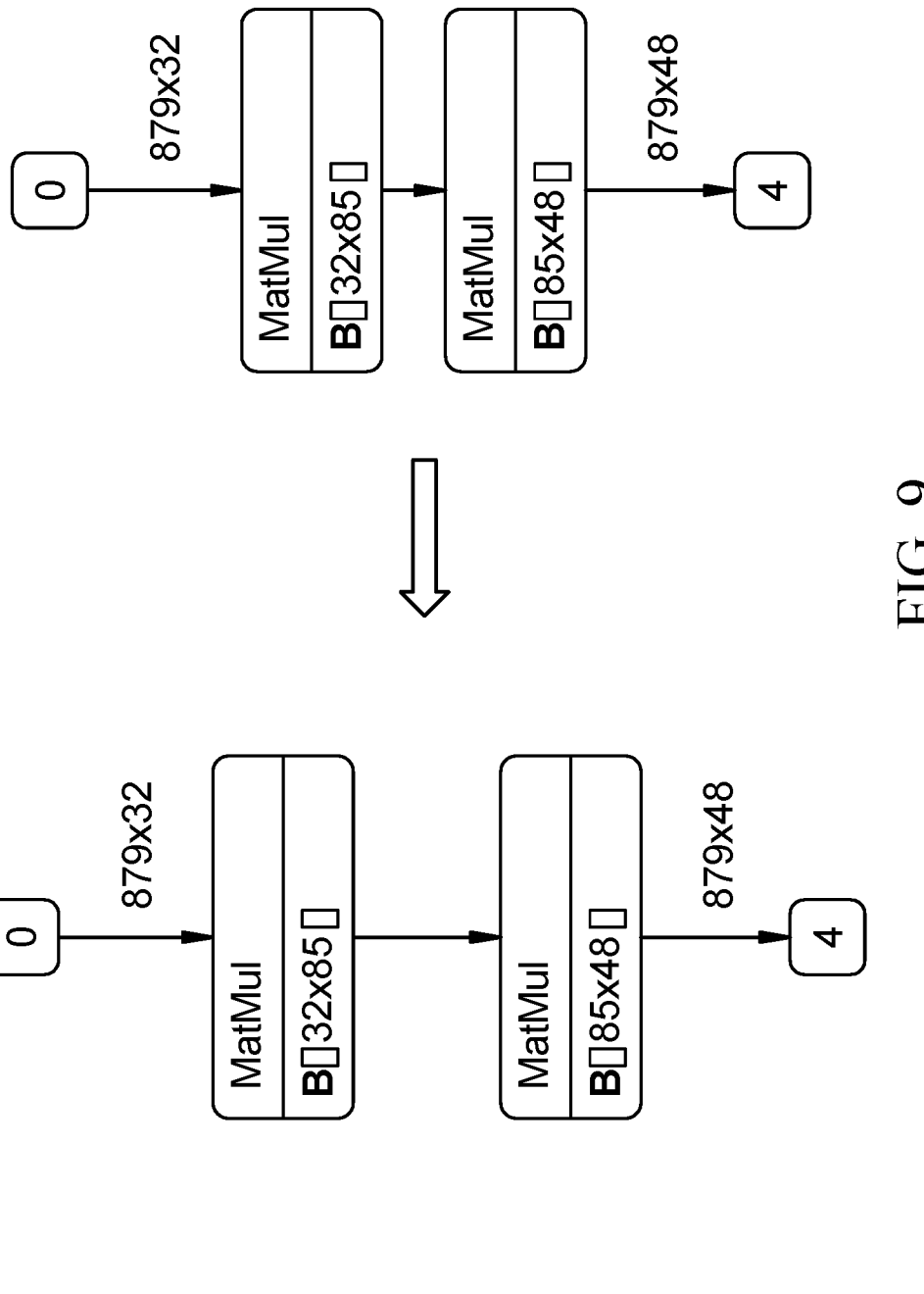
FIG. 9 depicts matmul functions represented as subgraphs after an inter op partition in accordance with some embodiments.

This combination of compiler and deterministic processor can compile and execute, respectively, very large models of virtually unlimited size across multiple modules. FIG. 9 depicts an exemplary large model such as Cosmic Tagger graphs having seven clusters which can be allocated to a minimum of 7 modules. Other large models such as the 65 billion Llama model can be allocated across a minimum of 580 modules.

However, it is not just the size of these modern models that requires the compiler to partition the models, partitioning is also used to drive improvements in the execution of the models. For example, for a small subgraph that fits on one module, the compiler may apply its partitioning schemes to further partition the model and allocate the subgraph to multiple modules (e.g., eight modules) to achieve linear scaling in terms of latency and throughput. This type of scaling is not possible with other types of architectures such as GPUs. Further, because GPUs and CPUs have much more HBM memory, GPUs and CPUs can partition at a much less granular level. The TSP module has limited SRAM memory and the margin of error of a compilation failure is much greater. Further, although smaller devices may have a plurality of modules (such as 8) that have a high degree of connectivity, the connectivity to other modules may have lower connectivity to most adjacent devices and higher connectivity to only a select few adjacent devices. Thus, the partitioning of a graph or subgraph must take into consideration the topology of the modules and device network connection.

Figure 10:
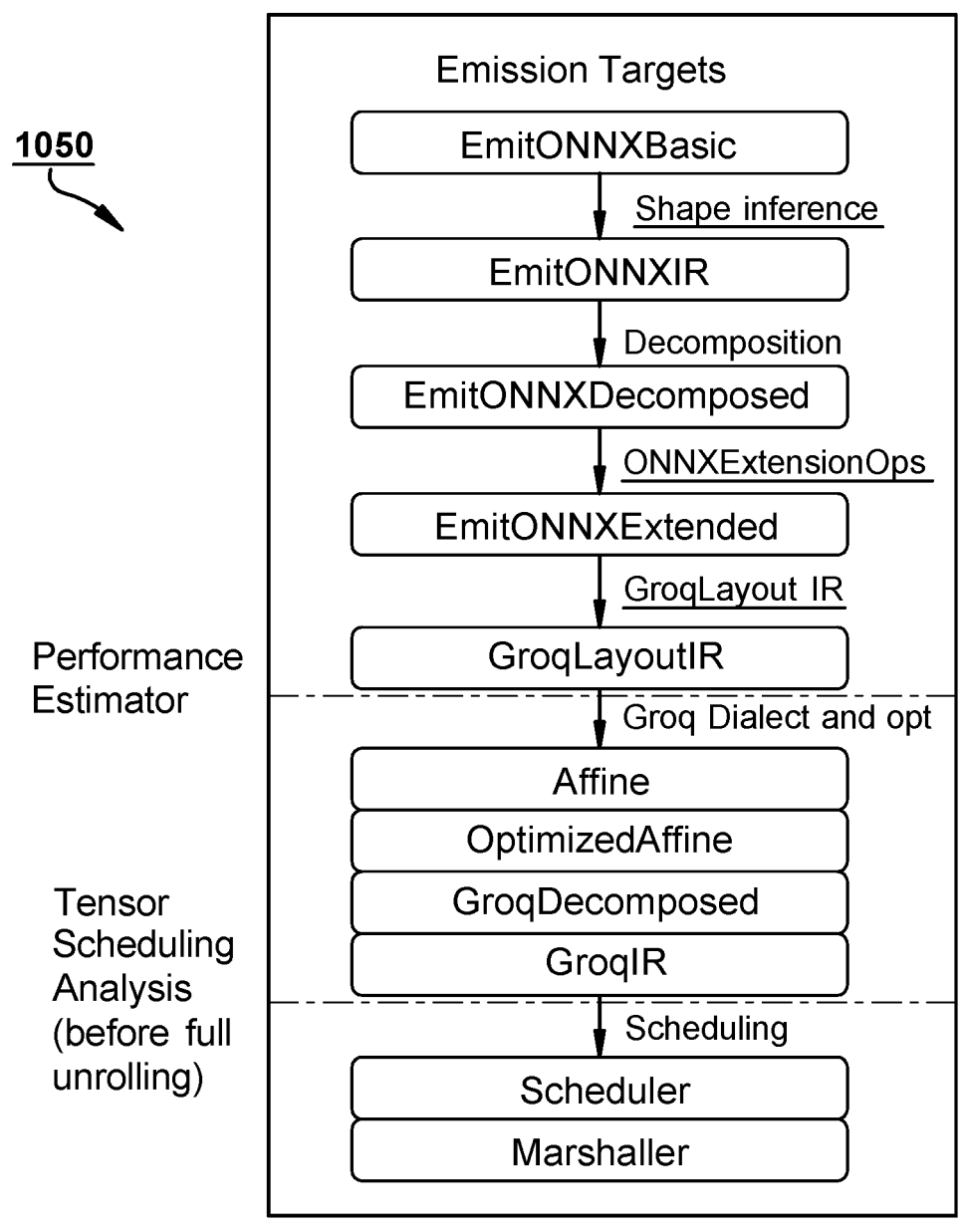
FIG. 10 depicts a more detailed view of a deterministic compiler in accordance with some embodiments.

FIG. 10 illustrates a more detailed view of a deterministic compiler in accordance with some embodiments. More specifically, the open-source ONNX (Open Neural Network Exchange) package is a popular framework-agnostic format and ecosystem for representing and exchanging deep learning models. ONNX provides a common standard to enable interoperability between various deep learning frameworks, allowing models trained in one framework to be used and deployed in another framework. ONNX serves as a bridge between different deep learning frameworks such as PyTorch, TensorFlow, Keras, and others. It allows users to export their trained models from one framework into the ONNX format, which represents the model's architecture and parameters in a standardized way.

The ONNX format enables the exchange of deep learning models across different tools and platforms. It provides a common language that allows researchers, developers, and practitioners to share models without worrying about the specific framework dependencies.

ONNX enables optimization of model inference across frameworks and platforms. Once a model is exported in the ONNX format, it can be optimized using various techniques specific to the target deployment environment, such as quantization, pruning, and hardware-specific optimizations.

With ONNX, models can be deployed in a wide range of environments, including edge devices, cloud services, and specialized hardware. The framework-agnostic nature of ONNX allows models to be deployed on platforms that support ONNX, regardless of the original training framework.

ONNX provides a comprehensive ecosystem of tools and libraries to support various stages of the deep learning workflow. This includes converters to export models from popular frameworks to ONNX, runtime libraries for efficient model inference, optimization tools, visualization tools, and graph generation. The output of the ONNX state is a GroqLayout IR which is an intermediate representation targeted to the GroqChip device.

Figure 11:
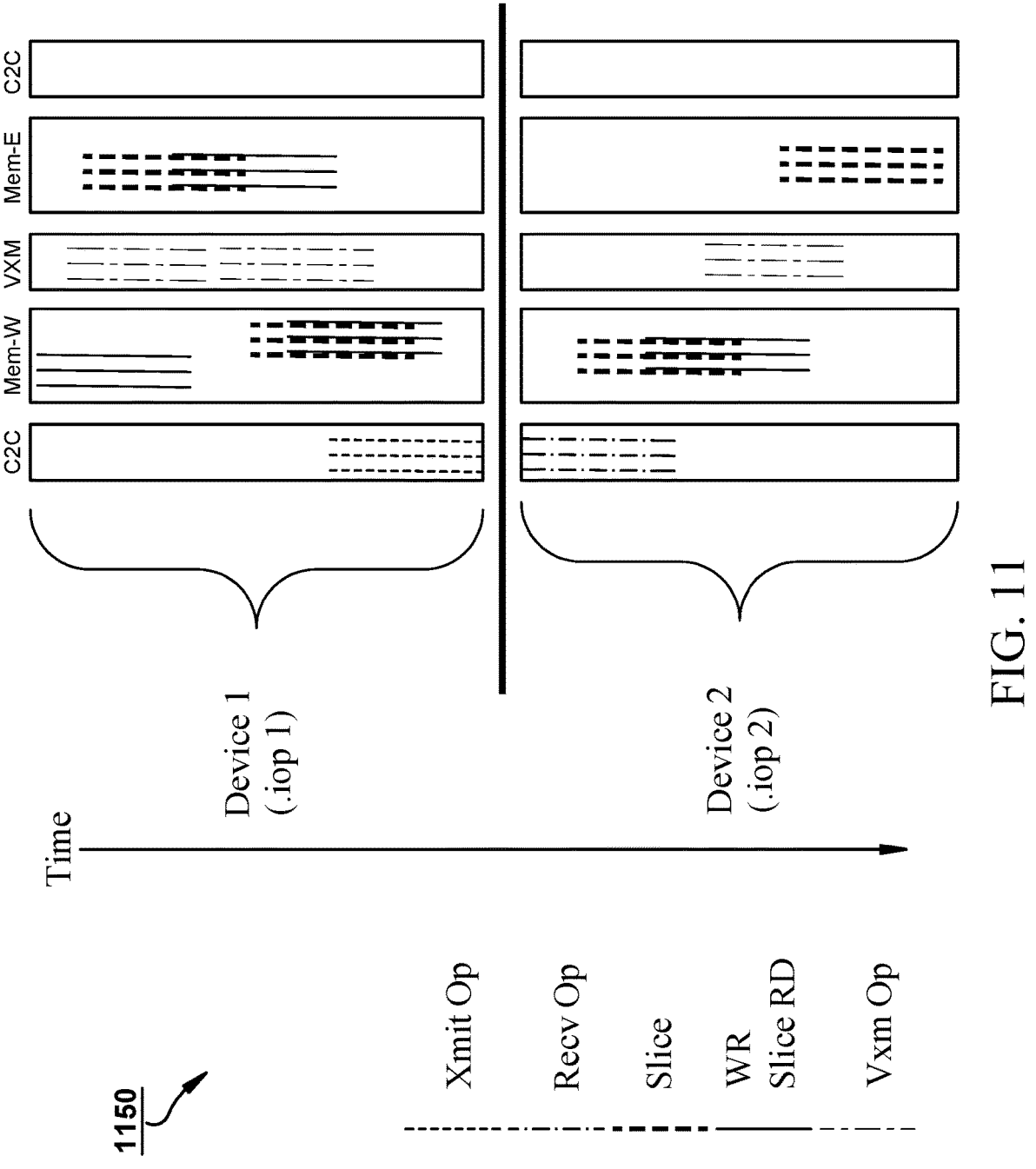
FIG. 11 depicts two subgraphs using a visualizer program following an inter op partition in accordance with some embodiments.

FIG. 11 illustrates two subgraphs using the visualizer program 124 following an inter op partition in accordance with some embodiments. Here, the output of the first Device (Device1) is shown as an "Xmit Op", executed by the C2C, that follows a plurality of memory, multiplier and ALU operations (performed by the VXM).

Device2 has a first Recv Op, executed by the C2C, to obtain the intermediate output of Device1 followed by a series of memory, multiplier and ALU operations. Although not illustrated, other devices may be connected to either or both devices and additional operations may be performed as FIG. 11 is intended to illustrate how data flows across the devices during a small period of time.

Figure 12:
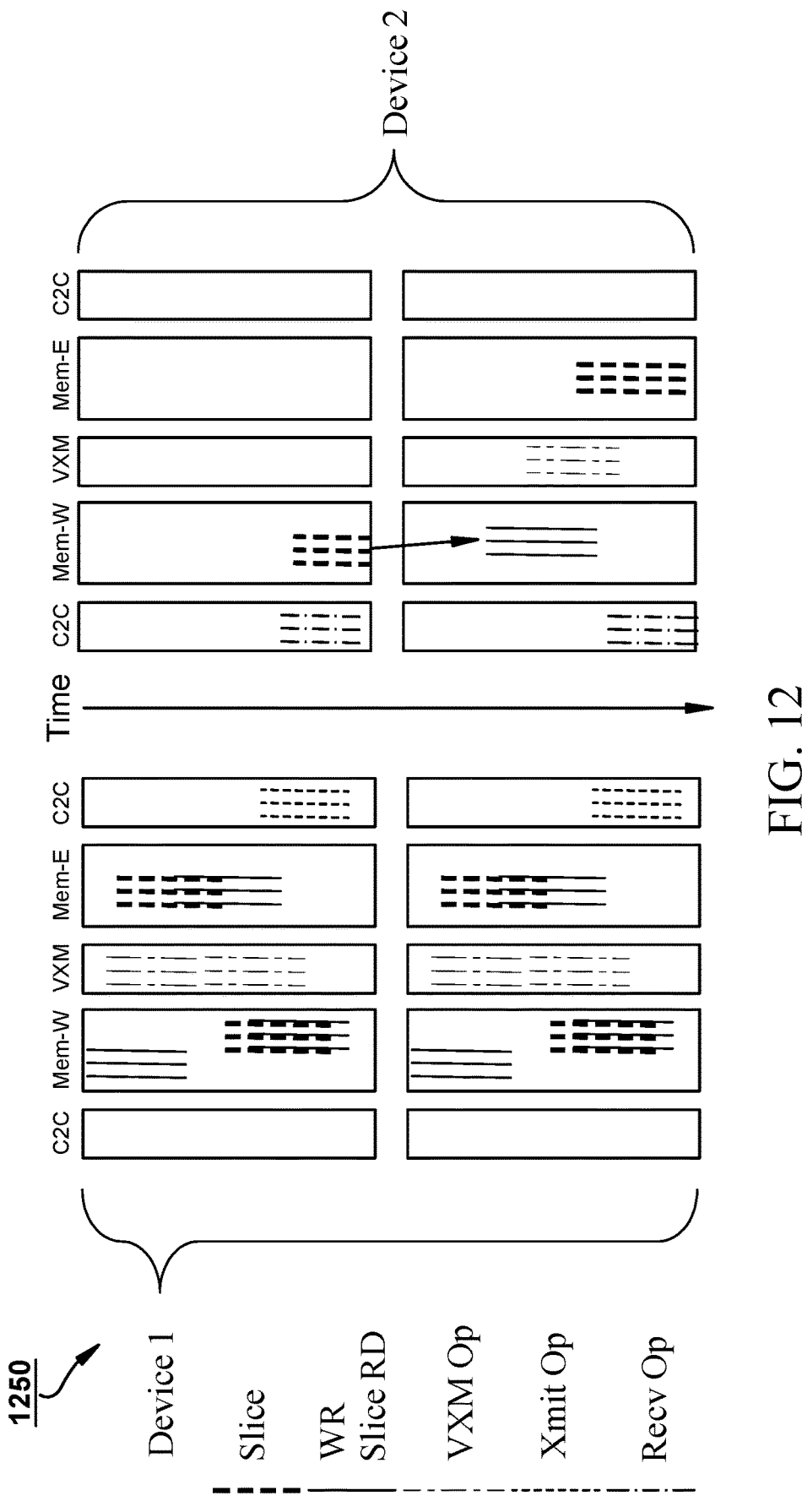
FIG. 12 illustrates two subgraphs using the visualizer program following an intra op partition in accordance with some embodiments.

Similarly, FIG. 12 illustrates two subgraphs using the visualizer program 124 following an intra op partition in accordance with some embodiments. Here Device1 performs a series of parts of an operation before transferring intermediate data to Device2 to finish the instruction execution by performing a second series of operations on the transferred data.

In accordance with various embodiments of the present disclosure, graph partition path has short- and long-term goals. At ONNX level (short term goal) of the program compilation there is little visibility of the on-chip resources that are required to implement the program. After GroqLayoutPasses and the IR is available, there is greater awareness of the resource requirements but less information as to what the IR represents in terms of the original program. Thus, before the compiler passes control from the ONNX stage to GroqAffinePasses(Affine) stage, the partitioning algorithm can retrieve shape, enablePerlEstimatorPass to estimate MXMOps performance at this high level. At Pre-scheduler level (long term goal) after GroqAffineToGroqIRPasses and GroqIR is available there is greater visibility as to how the machine level instructions will be scheduled so before GroNSchedulerPasses (Scheduler) it is preferred to make use of TSA to verify the resource requirements of the partitioned graph and to verify both the live state and the peak live state for each subgraph.

TABLE I illustrates implementation trade offs for the various partition levels.
Implementation-Partition Level

| Partition Level | Pros | Cons |
|---|---|---|
| ONNX/ ONNX De- composed | Faster compilation because of relatively small model size Pipelining maybe more efficient led by more sufficient time in exploring possible partitioning | Can only approximate resource usage-cannot verify if partitioned subgraphs fit on the chip |
| TSA | More accurate estimation of resource usage (live buffer and latency) Better parallelization and lower latency because of more accurate estimation | Longer compilation time due to number of ops (may change due to uniform scheduling) May be affected by future implementation/design changes |

Graph Partitioning: In some embodiments, it is preferable to use the same allocation and dis-allocation phases across the devices. Partitions are preferably selected using weight size and estimated live buffer size once IR is available (at the ONNX level). The compiler tracks live buffer state and peak live buffer state at a per device. Easy to enable pipelined execution between TSP devices and provide high utilization of MXM s when partitioning at the ONNX level but there is faster total compute time when partitioning at the scheduler level due to the scheduler's nonlinearity. When partitioning at the ONNX level, the partitions may underestimate memory utilization of some layers resulting in compile failure. Thus, in one embodiment, there is a first partition at the ONNX level (inter op partitioning) and a second partition at the TSA (intra op partitioning). Finer grained partitioning enables higher degree of parallelism and lower latency.

Graph partitioning may use a performance estimator to guide partition selection. Graph partitioning may calculate per device peak live memory to ensure each subgraph fits onto each module. Graph partitioning should parallelize MXM compute wherever possible. Graph Partitioning may be based on cost function. Graph partitioning should minimize the number of edges crossing partition boundaries, balance compute between devices, and eliminate feedback loops between TSP modules. Graph partitioning also needs to be based on a selected topology because intermediate activations may become inputs to successive graphs. In some topologies, the network bandwidth may be limited between some modules so it may increase latency if the next module is many hops away. Partitioning needs to be based on topology if it is fixed. For example, the topology may comprise fully connected eight TSP devices or two TSP devices with 4x links or four TSP devices with 2x links. In another embodiment, multiple fully connected Groq Nodes are connected through single link or daisy chained to link computer components together in series. In some embodiments, ONNX provides a graph partitioner to create the graph partition.

Figure 13:
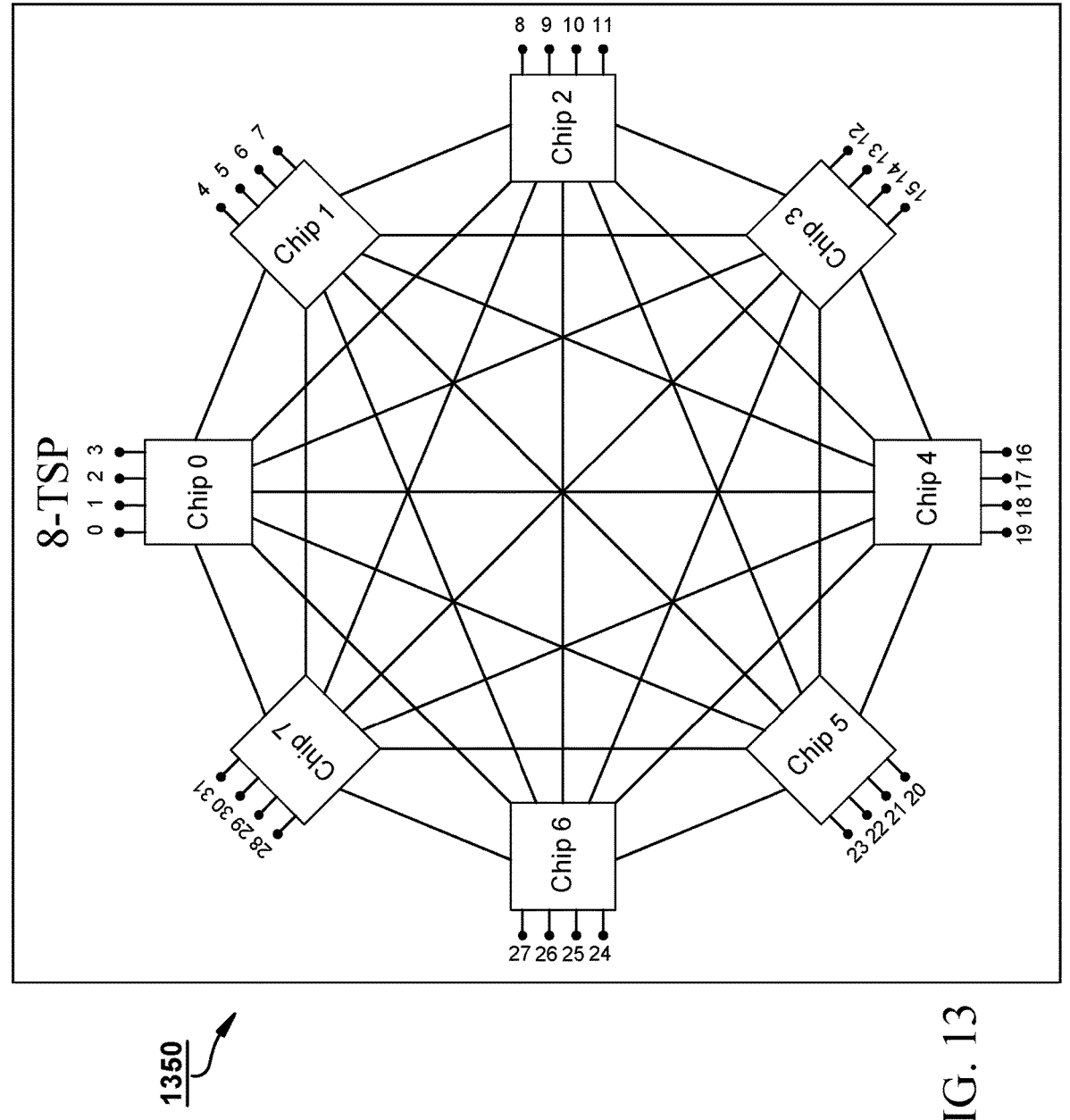
FIG. 13 depicts GroqNode DragonFly topology, in accordance with some embodiments.

FIG. 13 depicts GroqNode DragonFly Topology, in accordance with some embodiments.

Figure 14:
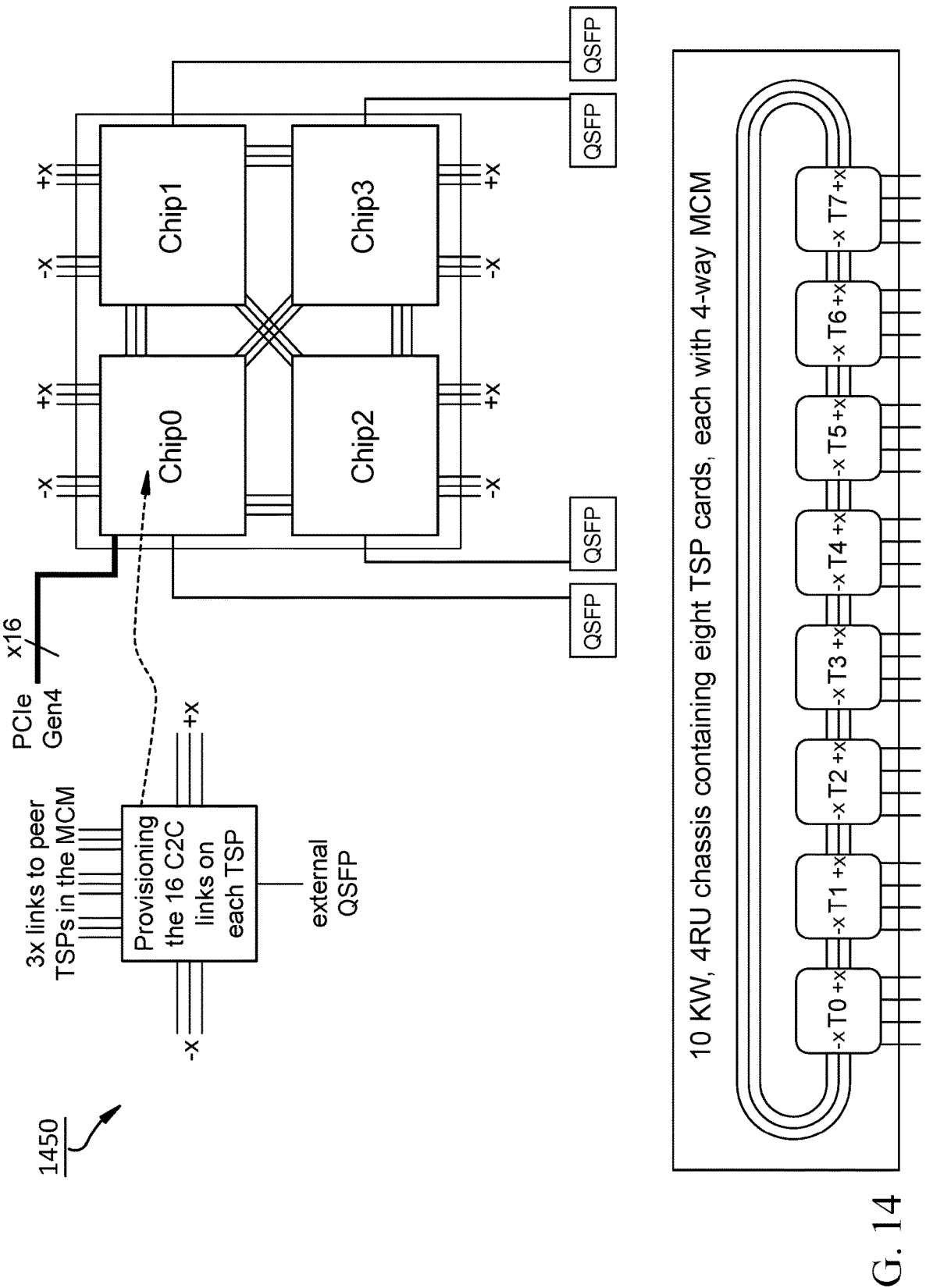
FIG. 14 depicts a Multi-Chip Module (Diphda) topology, in accordance with some embodiments.

FIG. 14 shows Multi-Chip Module (Diphda) topology, in accordance with some embodiments.

FIG. 15 shows the result of using a rack of TSP devices for executing a GPT model in accordance with some embodiments. A transformer is a deep learning model. It is distinguished by its adoption of self-attention, differentially weighting the significance of each part of the input (which includes the recursive output) data. It is used primarily in the fields of natural language processing (NLP) and computer vision (CV).

Like Recurrent Neural networks (RNNs), transformers are designed to process sequential input data, such as natural language, with applications towards tasks such as translation and text summarization.

The methodology comprises partitioning the ONNX graph to generate a plurality of subgraphs, each subgraph having a peak live state that will run on one TSP device. Then run compiler Tensor Scheduler Analysis (TSA) to get the estimated compute cycles and rewrite ONNX ops into Groq ops. Then evaluate VXM, SXM, and MXM resource occupancy into account together with the number of C2C cycles to obtain a multichip performance estimate. Based on the estimate, the compiler may further optimize where a resource has high utilization by further partitioning the graph or subgraph into more granular subgraphs.

Disclosed are configurations that include an integrated circuit with one or more deterministic processors (e.g., tensor streaming processors (TSPs) or artificial intelligence processors). Each may have a functional slice architecture. In some embodiments, each deterministic processor is configured to process a machine learning model. Each deterministic processor is divided into a plurality of functional units. The functional units are organized into a plurality of functional slices. Each functional slice is configured to perform specific functions within the deterministic processor. The deterministic processor may include memory functional slices (MEMs) for storing operand data, arithmetic functional slices for performing operations on received operand data (e.g., vector processing, matrix manipulation), and/or the like. Functional units of the deterministic processor are configured to stream operand data across a first (e.g., temporal) dimension in a direction indicated in a corresponding instruction, and receive instructions across a second (e.g., spatial) dimension. The compiler for the deterministic processor is aware of the hardware configuration of the processor and configures the timing of data and instruction flows such that corresponding data and instructions are intersected at each computational element at a predetermined time. Each functional slice of the deterministic processor may operate on a set of data lanes in a Single Instruction Multiple Data (SIMD) manner. The set of data lanes can be referred to herein as a "superlane" and represents a cross-section of all the functional slices on a processor module.

The disclosed embodiments are directed to a deterministic streaming processor having a functional slicing architecture. In some embodiments, the deterministic streaming processor may comprise a tensor streaming processor (TSP) having a functional slicing architecture, which may be used for hardware-accelerated machine learning (ML) applications.

The deterministic streaming processor (e.g., TSP) comprises a plurality of "computational elements," each computational element corresponding to a functional unit within the processor. The on-chip memory and network-on-chip (NoC) of the processor architecture are fused to provide both storage of operands and results and may act as a conduit for transferring operand and/or result data to/from the functional units of the processor. The computational elements of the deterministic streaming processor are divided between different functionalities (e.g., memory, arithmetic operation, etc.), and are organized as functional slices which operate on multi-dimensional data (e.g., tensors). For example, each functional slice is composed of computational elements which border (or abut) each other, both horizontal and vertically, to form the functional slice. The number of computational elements and computation granularity of each computational element may be selected to take advantage of the underlying technology on which it is built. Taken together, the number of computational elements (N) and the word granularity (M) of a memory (e.g., static random-access memory (SRAM)) yields the vector length (VL) of the machine.

In some embodiments, each functional slice of the deterministic streaming processor functions independently and receives instructions from an instruction control unit (ICU). The ICU may pass instructions to a first computational element of the functional slice, which are then propagated in a first temporal dimension of the processor along the functional slice to the remaining computational elements of the functional slice. On the other hand, data operands for storage and/or processing may be passed between different functional slices of the deterministic streaming processor, in a second spatial dimension of the processor perpendicular to the first temporal dimension. As such, the data flow and the instruction flow of the deterministic streaming processor are separated from each other.

In some embodiments, a compiler for the deterministic streaming processor is aware of the hardware configuration of the deterministic streaming processor and synchronizes the timing of data and instruction flows such that corresponding data and instructions are received at each computational element with a predetermined temporal relationship (e.g., during the same clock cycle, separated by a predetermined delay, etc.). In some embodiments, the predetermined temporal relationship may be based upon the hardware of the deterministic streaming processor, a type of instruction, and/or the like. Because the temporal relationship between data and instructions are known by the compiler, the operand data received by a computational element does not include any metadata indicating what the data is to be used for. Instead, each computational element receives instructions, and based upon the predetermined timing, performs the instruction on the corresponding data. This allows for the data and instructions to flow through the deterministic streaming processor more efficiently.

The compiler may partition an Open Neural Network Exchange (ONNX) graph to get a subgraph that would run on a single TSP device. The compiler may run a Tensor Scheduler Analysis (TSA) to obtain estimated compute cycles. The TSA includes post-rewriting of ONNX operations to TSP operations while taking occupancies of a vector execution module (VXM), switch execution module (SXM) and matrix execution module (MXM) into account. The estimate of compute cycles assumes perfect scheduling. The estimated compute cycles can be combined with estimates of module-to-chip (C2C) compute cycles for a multichip performance estimate.

Architectural Overview of Tensor Streaming Processor

Figure 16:
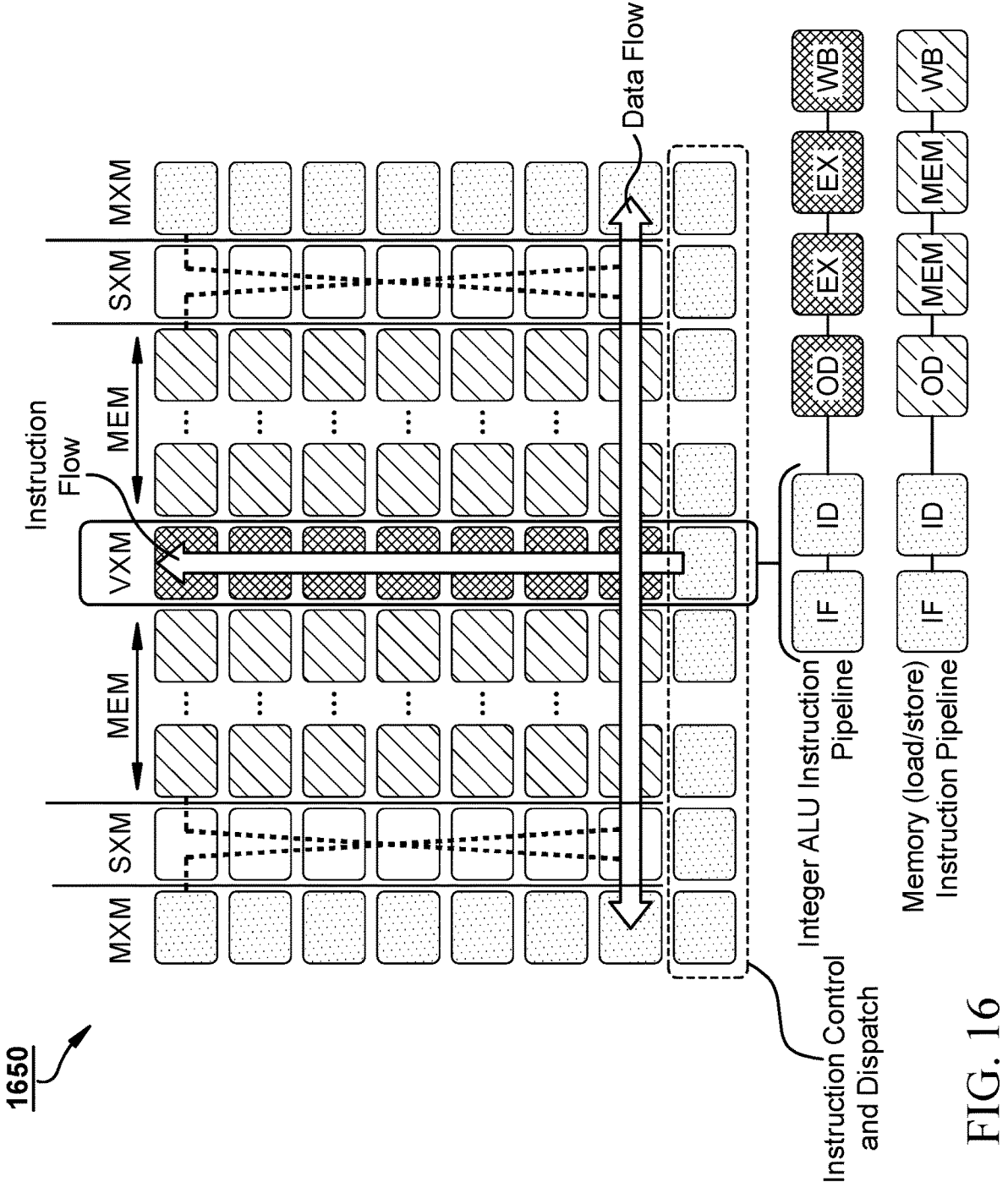
FIG. 16 illustrates an arrangement of functional slices in a tensor streaming processor (TSP), in accordance with some embodiments.

In accordance with embodiments of the present disclosure, the processor plane comprises a TSP, e.g., as may be commercially available from GROQ, INC. of Mountain View, California. It is to be understood that although many embodiments described herein use a TSP as the preferred processors, other deterministic processors may be used in commercial applications. FIG. 16 shows an arrangement of functional slices in a TSP, in accordance with some embodiments.

Certain core architectural elements set the TSP apart from GPU and accelerators. In a conventional module multiprocessor (CMP), each "computational element" is an independent core that is interconnected using the on-chip network to exchange data between cores. Instruction execution is carried out over several stages: (i) instruction fetch (IF), (ii) instruction decode (1D), (iii) execution (EX) on Arithmetic Logic Units (ALUs), (iv) memory access (MEM), and (v) writeback (WB) to update the results in the general-purpose registers (GPRs).

In contrast from conventional multicore, where each computational element is a heterogeneous collection of functional units but globally homogeneous, the TSP inverts that to have a local functional homogeneity but module-wide (global) heterogeneity. Specifically, the TSP reorganizes the homogeneous two-dimensional mesh of cores into the functionally sliced microarchitecture shown in FIG. 16. In this approach, each computational element implements a specific function and is stacked vertically into a specific "functional slice" in the Y-dimension of the two-dimensional on-chip mesh. The TSP disaggregates the basic elements of the conventional multicore per their respective functions: instruction control and dispatch (e.g., via instruction control unit (ICU)), memory (MEM), integer (INT) arithmetic, float point unit (FPU) arithmetic, and network (NET) interface, as shown by the functional slice labels at the top of FIG. 16 Each row of the two-dimensional on-chip mesh contains a cross section of all functional slices.

In this organization, each functional slice is independently controlled by a sequence of instructions specific to its on-chip role. For instance, the MEM functional slices support Read and Write but not, necessarily Add or Mul, which are typically performed in arithmetic functional slices (e.g., the vector execution module (VXM) and matrix execution module (MXM) functional slices) for some typical machine learning (ML) algorithms, such as the linear regression algorithm.

All functional slice's computational elements execute the same instruction stream—Single Instruction Multiple Data (SIMD) instructions. Thus, the common instruction decodes, and dispatch logic can be factored out into its own computational element (e.g., ICU) and decompose the normal instruction execution pipeline into two areas: (i) instruction fetch, decode, and parceling and (ii) operand read, execute, and writeback. This approach decouples the memory subsystem from the functional units retrieving their operands and depositing results.

Figure 17:
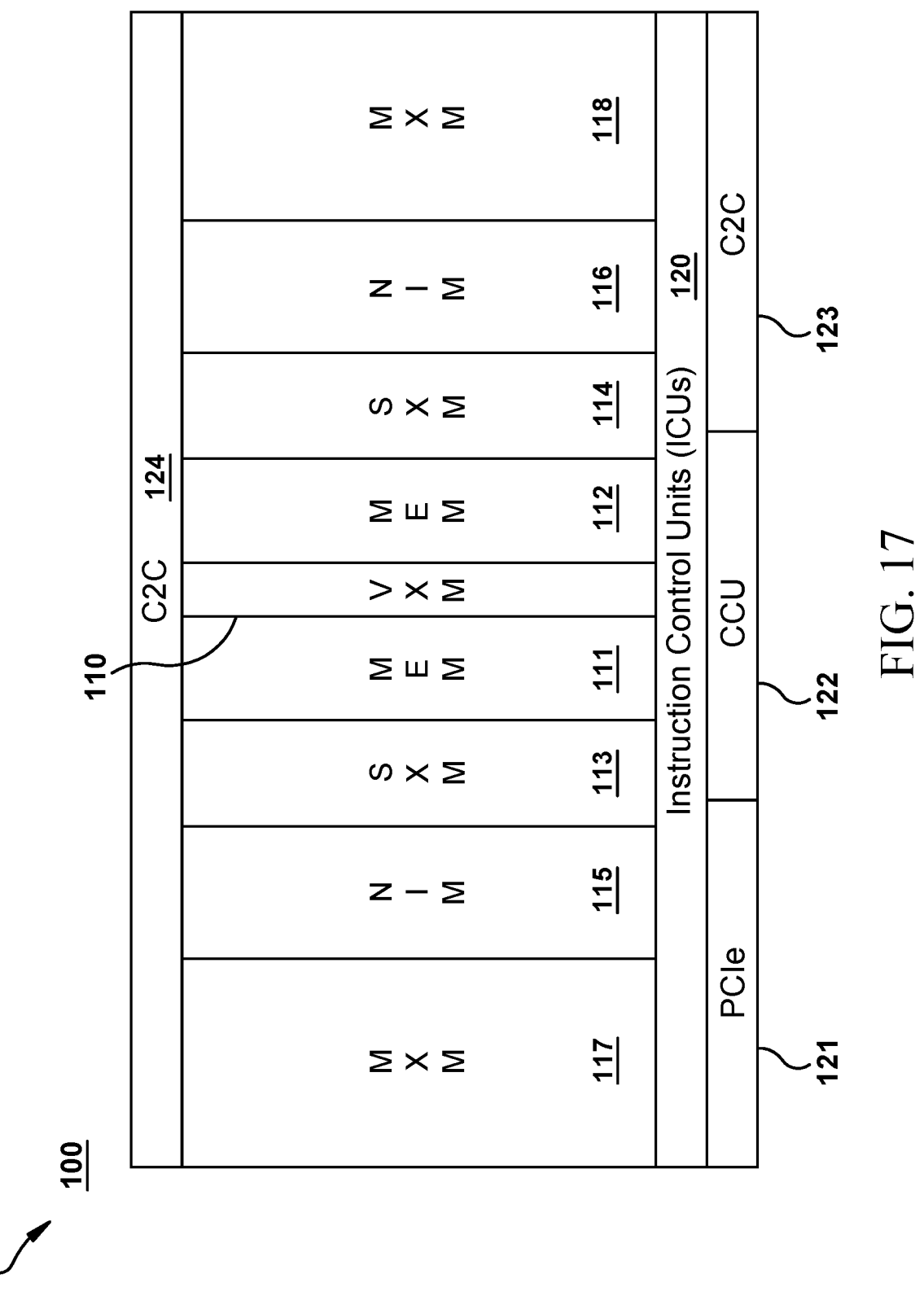
FIG. 17 illustrates an example TSP architecture, in accordance with some embodiments.

In some embodiments, each functional slice implements, e.g., a 20-stage vector pipeline that spans the computational elements of each functional slice, with each computational element producing 16 elements of the 320-element maximum vector length. This organization naturally decomposes instruction flow in the vertical dimension, and data flow in the horizontal dimension as the data flow passes over different function types. With this processor organization, instruction execution is carried out by different computational elements: instruction fetching and decoding in the ICU and operand decode, execution and writeback at each computational element of the functional slice as the (vertical flowing) dispatched instruction intersects with the (horizontal flowing) operand data on which the dispatched instruction is operating. It will be appreciated that reference to 'vertical' and 'horizontal' or 'north', 'south', 'east' and 'west' are used in connection with the illustrations shown in the Figures, are abstractions that are solely intended to aid the reader and should not be inferred as technical limitations, FIG. 17 illustrates an example TSP 100, in accordance with some embodiments. The TSP 100 may include memory and arithmetic units optimized for multiplying and adding input data with weight sets (e.g., trained or being trained) for machine learning applications (e.g., training or inference). For example, the TSP 100 includes a VXM 110 for performing operations on vectors (e.g., one-dimensional arrays of values). Other elements of the system are arranged symmetrically on either side of the VXM 110 to optimize processing speed. For example, the VXM 110 is adjacent to MEMs 111-112. SXMs 113-114 to control routing of data, data domain and presentation controllers (or numerical interpretation modules (NIM s)) 115-116, and MXMs 117-118. An ICU 120 controls the flow of data and execution of operations across blocks 110-118, for example. The TSP 100 may further include communications circuits such as module-to-module (C2C) circuits 123-124 and an external communication circuit (e.g., PCie) 121. The TSP 100 may, for example, further include a TSP device control unit (CCU) 122 to control boot operations, clock resets, and other low level setup operations.

Figure 18:
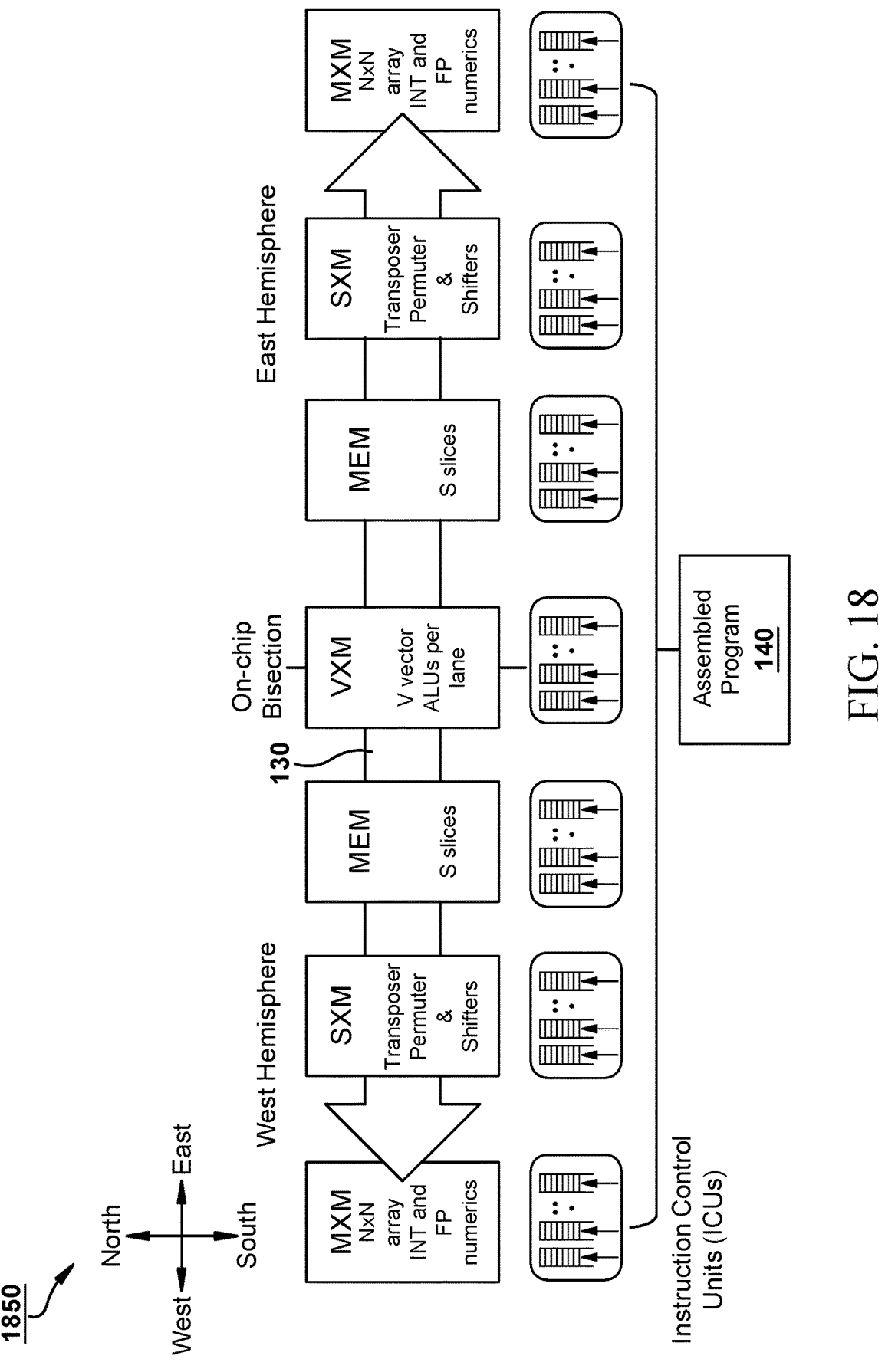
FIG. 18 illustrates organization and data flow within a row of a TSP, in accordance with some embodiments.

FIG. 18 illustrates organization and data flow within a row of the TSP 100, in accordance with some embodiments. As shown in FIG. 18, each row of the two-dimensional on-chip mesh of the TSP 100 contains a cross section of all functional slices, e.g., N×N array of MXMs (e.g., N=320) configured for both integer (INT) and floating-point (FP) numeric (e.g., INT8 and FP16). S MEM functional slices (S=44), VXM functional slices with V vector ALUs per lane (e.g., V=16), and SXM functional slices. In this organization, each functional slice is independently controlled by a sequence of instructions specific to its on-chip role fetched by a corresponding array of ICUs (e.g., a total of ICUs=144 ICUs). Conceptually, the functional slices are fixed and data 130 are flowing across their computational elements. As the data flows through a specific functional slice, each functional slice can optionally intercept the data operands and compute a result (e.g., in case of MMI and VXM), or move data between data transport lanes on the network (e.g., in case of SXM and MEM). Instructions flow northward from the ICUs to the functional slices, while data (operands and results) primarily flow east and west between functional slices. Any inter-lane data movement within a vector uses the on-chip network functional slice.

It is noted that the "east-west-north-south" directionality is provided herein for ease of discussion and relativity. Furthermore, the "east-west-north-south" directionality is used as a reference for explanation of processing flow as described herein and is not intended to be limited with respect to a label of a particular direction. For example, north-south could be reoriented to east-west, and the principles currently described with east-west could apply to the reoriented north-south. In another example of the directionality not intended to be limited to the description per the reference noted, directionality could be referenced such that north-south is up-down and east west is right-left and the principles would accordingly apply.

In one embodiment, 320 lanes are overlaid on the TSP 100 where each computational element in the on-chip mesh operates on, e.g., 16-lanes in a SIMD manner. The 16-lane unit can be referred to herein as a "superlane" and represents a cross-section of all the functional slices on the TSP device. As such, a superlane may represent the architecture's minimum vector length (minVL) of, e.g., 16 elements. Likewise, the vertical composition of 20 tiles forming a functional slice may produce a maximum vector length (maxVL) of, e.g., 20×16=320 functional units. Each of the 144 independent on-chip ICUs can issue one or more instructions per clock cycle. The compiler has explicit control of a program order in each instruction queue. e.g., by generating an assembled program 140 for execution by the ICUs and functional slices. There are 64 logical streams per lane for moving operands or results on-chip with, e.g., 32 streams eastward and 32 streams westward. The 220 MB of globally shared SRAM may deliver 32 bytes per lane of stream bandwidth and low-latency access to model parameters. For example, MEM can read and MXM can install more than e.g., 100.000 weights into a 320×320 array (e.g., 320 lanesx 320 functional units) in less than 30 clock cycles including SRAM and on-chip network transit delays.

As shown in FIG. 16 and FIG. 18, the on-chip network is implemented as X-dim mesh and Y-dim mesh of computational elements with X-Y-X dimension order routing. Each instruction specifies the first hop direction (east or west), so memory instruction semantics have both an address and a dataflow direction (see FIG. 18). Streams are routed in the X-dimension through MEM 111/112 and routed in the Y-dimension using the SXM's I 13/114 permuter and lane-shifters to move data elements vertically. The SXM's I 13/114 permuter implements a permutation function that is a mathematical technique that determines the number of possible arrangements in a set when the order of the arrangements matters. Common mathematical problems involve choosing only several items from a set of items with a certain order.

The MEM 111/112 and the SXM 113/114 provide deterministic routing of stream data as the stream data flows in the X and Y dimensions, respectively. With the TSP architecture 100, functional slices interact with streams of data in a producer-consumer fashion. That is, the functional slices consume operands from streams and produce results onto a (possibly different) stream, like an assembly line operator (functional slice) and conveyor belt (stream).

Conceptually, the functional slices are fixed, and data is flowing across computational elements as shown in FIG. 18. As the data flows through the functional slice, each computational element can optionally intercept the data operands and compute a result (if the computational element comprises an arithmetic logic unit (ALU)) or move data between lanes on the network if the computational element comprises a switching element.

Streams provide a programming abstraction and are a conduit through which data flows between functional slices. Unlike GPRs, the functional slices operate on streams of parallel data flowing east or west (horizontally) across the module. The horizontally flowing streams carrying operands intercept the vertically (northward) flowing instructions to perform a computation at a computational element on a functional slice. A compiler accurately maintains the TSP device's architectural state and uses that knowledge to ensure that instructions correctly intercept its stream operand(s).

Streams are implemented in hardware by a module-wide streaming register file. Streams are architecturally visible and transport operands and results between functional slices. A common software pattern involves reading operand data from one or more MEM functional slices that is then subsequently consumed and operated on by a downstream arithmetic functional slice. The results of the operation are then produced onto another stream such that they can be written back to memory or passed to subsequent computational elements. For example, a Z=X+Y operation might require four instructions: Read SI, X and Read S2, Y are executed on two MEM functional slices and directed inward toward an ALU functional slice to perform the Add SI, S2, S3. Lastly, the result is stored back to memory via a Write S3, Z. The streams represent a collection of N-elements, operated upon in a SIM D manner by each functional slice.

By way of example, a TSP architecture makes several deliberate tradeoffs on the hardware-software interface, pushing the complexities associated with scheduling into the compiler. Specifically, it falls on the compiler to precisely schedule instructions to use the hardware correctly and efficiently. At times this may involve selecting one of several means by which an algorithm or meta-operation may be realized on the hardware. Removing the control complexity of dynamic instruction scheduling for multi-issue execution units allows the ICU to be relatively small, accounting for, e.g., less than 3% of the module area.

The compiler has access to, e.g., 320-lane programming abstraction overlaid on a TSP architecture where each computational element in the on-chip mesh operates on 16-lanes in a SIMD manner. The 16-lane unit can be referred to as a "superlane" which is a cross-section of all the functional slices on the TSP device and the minimum granularity of computation. As such, a superlane represents the architecture's minimum vector length, minVL, of 16 elements.

Likewise, the vertical composition of 20 tiles to form a functional slice produces a maximum vector length, maxVL, of 20×16=320 elements.

The compiler has access to, e.g., 144 independent instruction queues (e.g., ICUs) on-module: (a) six for westward MXM including two independent two-dimensional MAC (multiply-accumulate) arrays; (b) 14 for westward SXM for intra-superlane and inter-lane switching by rearranging elements of vectors; (c) 44 for westward MEM including 44 parallel functional slices of static random-access memory (SRAM); (d) 16 for VXM including 16 vector ALUs per lane; (e) 44 for eastward MEM-including 44 parallel functional slices of SRAM; (f) 14 for eastward SXM; and (g) six for eastward MXM including two independent two-dimensional MAC arrays, whereas each instruction queue can issue one or more instructions per cycle and the compiler has explicit control of the program order in each instruction queue.

The compiler has access to, e.g., 64 logical streams per lane. For example, 32 logical streams are required to operate on 16 minVL per lane for moving operands or results on-chip with 32 streams eastward, and 32 streams westward.

The compiler has access to, e.g., 220 Mibytes of globally shared SRAM that delivers 32 bytes per lane of stream bandwidth and low-latency access to model parameters. For example, MEM can read and MXM can install 400K weights into all four 320×320 arrays in less than 40 operational cycles including SRA M and on-chip network transit delay.

Streams are designated by both an identifier (0, . . . ,31) and direction. For example, in(28) designates stream 28 inward, and out(24) designates stream 24 toward the outward edge of the TSP device. The direction of a stream may be designated as inward (toward the module bisection) or outward (toward the outward edge of the module), or the direction may be designated as eastward or westward, as shown in FIG. 18.

The components of a superlane are organized spatially as shown in FIG. 18. The TSP's instruction set architecture (ISA) defines instructions spanning different functional areas. The partitioned global address space (PGAS) presented by the MEM functional slices provides memory semantics for vectors to be addressed from SRAM and loaded into an architecturally visible stream with a direction of dataflow toward the functional slice intending to operate on them.

The first functional area (e.g., ICU) provides explicit instruction fetching with IFetch instruction(s), and inter-slice synchronization using Sync and Notify instructions to perform module-wide barrier synchronization among participating functional slices. A repeated-NOP (no-op) instruction allows for precise cycle-by-cycle control of inter-instruction delay. For example, the compiler has cycle-accurate control when scheduling two operations A and B using an intervening NOP so that N cycles separate them, e.g., OpA NOP(N) OpB.

The second functional area (e.g., VXM) consists of a 4×4 mesh of ALUs in each lane for point-wise arithmetic operations.

The third functional area (e.g., MXM) consists of four independent two-dimensional MAC arrays that operate on, e.g., INT8 or FP16 data types.

On-chip data movement uses the fourth functional area (e.g., SXM) for intra-superlane and inter-lane switching by rearranging elements of vectors. The SXM is analogous to the NET interface to communicate between cores. Together the MEM and SXM work in tandem to form the X-Y dimensions of the on-chip network.

The fifth functional area (e.g., the east and west hemisphere of on-chip MEM module) is composed of 44 parallel MEM functional slices of SRAM and provides the memory access concurrency necessary to fully utilize the 32 streams in each East or West direction. Each functional slice provides 13-bits of physical addressing of 16-byte memory words, each byte maps to a lane, for a total of 220 Mibytes of on-chip SRAM.

An additional sixth functional area includes C2C modules configured to provide Send and Receive primitives for exchanging 320-byte vectors between a pair of TSP devices. One possible TSP implementation has, e.g., a total of 16×4 links operating at 30 Gbps each for a total off-chip bandwidth of 16×4×30 Gbps×2 directions=3.84 Tb/s (Terabytes per second) of off-chip pin bandwidth that can be flexibly partitioned to support high-radix interconnection networks of TSPs for large-scale systems. The host interface for peripheral component interconnect express (PCie) Gen4 may be also handled in this module. The host interface provides a lightweight direct memory access (DMA) engine to emplace a model onto the TSP memory and provides an entry point for bootstrapping the model execution.

The host interface also provides a general mechanism for passing interrupts to the host, which may be necessary in the event a multi-bit memory error is observed, for example. A sequence of instructions performed on different functional slices can be chained to create more complex actions without the need to write back intermediate results to memory.

This allows efficient processing of streams at full bandwidth and lowest latency.

Machine learning algorithms typically operate on vectors with coefficients of a specified data type (e.g., INT8, FP16, etc.). These vectors may be interpreted as an abstraction over the underlying data, whose elements can be processed by the same operation in a SIMD manner. The TSP operates on vectors, sometimes organized into rank-2 tensors, and relies on the graph-lowering compiler to transform higher rank tensors into rank-2 tensors.

The TSP's programming model is a producer-consumer model where each functional slice acts as a consumer and a producer of one or more streams. When a vector is read from a main memory, the vector is given a stream identifier $(0, \ldots, 31)$ and direction: eastward, or westward. Once the vector is read into a stream register it is a stream and is "flowing" in the given direction in the following sense given spatially adjacent functional slices at coordinates xo, x1, x2 (where the spatial coordinate increases in the direction of flow), then at a given time ti, the vector representing stream s1 at functional slice x1 can be accessed as operands by that functional slice. Similarly, the functional slices at xo and x2 will have access to different stream values for the same stream register. In the following cycle tH1, the value s1 either propagated to the functional slice at x2, or else the value s1 is overwritten with a result n produced by the functional slice at x1 at cycle t. Similarly, the stream value that was present to be consumed by the functional slice at coordinate xo at time ti will be (absent xo overwriting the value at time ti) available in the next cycle tH1 to the functional slice at xi. Stream operands are steered toward the functional slice that is consuming them and producing a result stream. Streams are constantly flowing across the module, serving as how functional slices communicate with one another.

In the TSP programming model, an instruction is issued on a functional slice at a given compiler-scheduled time t and executes as a SIMD operation on stream-supplied operand vectors (e.g., of up to 320-elements), producing vectors of the same length on result streams. For example, at the micro-architectural level, the 320-element SIMD instruction is pipelined across the vertical stack of computational elements in the functional slice. That is, at the scheduled time t, the instruction would be issued to the bottom-most computational element of the functional slice, e.g., corresponding to the first 16-element superlane of operand/result vectors. In the subsequent operational cycle, the instruction would be propagated to the next computational element northward in the functional slice, which in turn executes the instruction on the next 16-element super lane of operand vectors. This process continues cycle-by-cycle until the process has traversed, e.g., all 20 computational elements in the functional slice. The combination of vertical instruction pipelining described above, along with the need for operands and instructions to coincide at a precise time, results in a spatial "stagger" of SIMD operand and result data, Example Computer System Architecture FIG. 19 is an abstract diagram of an example computer system suitable for enabling embodiments of the claimed disclosures, in accordance with some embodiments.

Figure 19:
FIG. 19 is an abstract diagram of an example computer system suitable for enabling embodiments of the claimed disclosures for use in commerce, in accordance with some embodiments.

In FIG. 19, the structure of computer system 210 typically includes at least one computer 214 which communicates with peripheral devices via bus subsystem 212. Typically, the computer includes a processor (e.g., a microprocessor, graphics processing unit, or digital signal processor), or its electronic processing equivalents, such as an ASIC or FPGA. Typically, peripheral devices include a storage subsystem 224, comprising a memory subsystem 226 and a file storage subsystem 228, user interface input devices 222, user interface output devices 220, and/or a network interface subsystem 216. The input and output devices enable direct and remote user interaction with computer system 210. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, for example, MICROSOFT WINDOWS, APPLE MACOS and IOS, GOOGLE ANDROID, Linux and/or Unix. The computer system typically includes a Basic Input/Output System (BIOS) and processor firmware. The operating system, BIOS and firmware are used by the processor to structure and control any subsystems and interfaces connected to the processor. Example processors that enable these operating systems include: the Pentium, Itanium, and Xeon processors from INTEL; the Opteron and Athlon processors from AMD (ADVANCED MICRO DEVICES); the Graviton processor from AMAZON; the POWER processor from IBM; the SPARC processor from ORACLE; and the ARM processor from ARM Holdings.

Any embodiment of the present disclosure is limited neither to an electronic digital logic computer structured with programs nor to an electronically programmable device. For example, the claimed embodiments can use an optical computer, a quantum computer, an analog computer, or the like. In other embodiments, the claimed embodiments can use a computing machine such as a tensor streaming processor designed and manufactured by GROQ, INC. of Mountain View, California. Further, where only a single computer system or a single machine is signified, the use of a singular form of such terms also can signify any structure of computer systems or machines that individually or jointly use processes. Due to the ever-changing nature of computers and networks, the description of computer system 210 depicted in FIG. 19 is intended only as an example. Many other structures of computer system 210 have more components than the computer system depicted in FIG. 19.

Network interface subsystem 216 provides an interface to outside networks, including an interface to communication network 218, and is coupled via communication network 218 to corresponding interface devices in other computer systems or machines. Communication network 218 can comprise many interconnected computer systems, machines and physical communication connections (signified by 'links'). These communication links can be wireline links, optical links, wireless links (e.g., using the Wi-Fi or Bluetooth protocols), or any other physical devices for communication of information. Communication network 218 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or Integrated Services Digital Network (ISDN)), (asynchronous) digital subscriber line (DSL) unit, Firewire interface, universal serial bus (USB) interface, and the like. Communication algorithms ('protocols') can be specified using one or communication languages, such as Hypertext Transfer Protocol (HTTP), Transmission Control Protocol/Internet Protocol (TCP/IP), Real-time Transport Protocol/Real Time Streaming Protocol (RTP/RTSP), Internetwork Packet Exchange (IPX) protocol and/or User Datagram Protocol (UDP).

User interface input devices 222 can include an alphanumeric keyboard, a keypad, pointing devices such as a mouse, trackball, toggle switch, touchpad, stylus, a graphics tablet, an optical scanner such as a bar code reader, touchscreen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 210 or onto communication network 218. User interface input devices typically enable a user to select objects, icons, text and the like that appear on some types of user interface output devices, for example, a display subsystem.

User interface output devices 220 can include a display subsystem, a printer, a fax machine, or a non-visual communication device such as audio and haptic devices. The display subsystem can include a CRT, a flat-panel device such as an LCD, an image projection device, or some other device for creating visible stimuli such as a virtual reality system. The display subsystem can also provide non-visual stimuli such as via audio output, aroma generation, or tactile/haptic output (e.g., vibrations and forces) devices. Typically, the term 'output device' signifies all possible types of devices and processes to transfer data and information out of computer system 210 to the user or to another machine or computer system.

Such devices are connected by wire or wirelessly to a computer system. Note that some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 226 typically includes several memories including a main RAM 230 (or other volatile storage device) for storage of instructions and data during program execution and a ROM 232 in which fixed instructions are stored. File storage subsystem 228 provides persistent storage for program and data files, and can include a hard disk drive, a floppy disk drive along with associated removable media, a CD-ROM drive, an optical drive, a flash memory such as a USB drive, or removable media cartridges. If computer system 210 includes an input device that performs optical character recognition, then text and symbols printed on a physical object (such as paper) can be used as a device for storage of program and data files.

The databases and modules used by some embodiments can be stored by file storage subsystem 228.

Bus subsystem 212 provides a device for transmitting data and information between the various components and subsystems of computer system 210. Although bus subsystem 212 is depicted as a single bus, alternative embodiments of the bus subsystem can use multiple buses. For example, a main memory using RAM can communicate directly with file storage systems using DMA systems.

A program or data transferred into and out of a processor from a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

ADDITIONAL CONSIDERATIONS

The disclosed configurations may have benefits and advantages that include, for example, a more efficient data flow by separating the functions of the processor into specialized functional units and configuring the timing of data and instructions to each functional unit, such that each unit is able operate on received data based upon a known timing between received data and instructions. Because the compiler for the processor is hardware aware, it is able to configure an explicit plan for the processor indicating how and when instructions and data operands are transmitted to different tiles of the processor. By accounting for the timing of received instructions and data, the data can be transmitted between the tiles of the processor without unnecessary metadata, increasing the efficiency of the transmission. In addition, by separating the transmission of data and instructions, instructions can be iterated and looped independent of received data operands.

In addition, because each computational element of the processor is dedicated to a specific function (e.g., MEM, VXM, MXM, SXM), the amount of instructions needed to be processed by the computational elements may be reduced. For example, certain computational elements (e.g., in MXM functional slice) may be configured to perform a limited set of operations on any received data. As such, these computational elements may be able to operate without having to receive explicit instructions or only receiving intermittent or limited instructions, potentially simplifying operation of the processor. For example, data operands read from memory can be intercepted by multiple functional slices as the data is transmitted across a data lane, allowing for multiple operations to be performed on the data in a more efficient manner.

In operation, a host computer programs a DMA engine to actually transfer data, again all of which is coordinated by the runtime layer. Specifically, the IDU transfers 320-byte vectors from PCie-Gen4 32-bytes every core-clock cycle (e.g., nominal 900 Mhz). Thus, the 320-element vector arrives over a period of 10 cycles and is placed on multiple streams moving towards the MEM. The incoming streams flow on S24-31 (upper eight streams), from which the MEM performs a "write" to commit that vector to SRAM. Hence, a PCI-Receive consists of (i) receiving the data from the PCI interface, and (ii) writing the vector into the specified functional slice of the MEM.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or maybe architectures employing multiple processor designs for increased computing capability.

Some embodiments of the present disclosure may further relate to a system comprising a processor (e.g., a tensor streaming processor or an artificial intelligence processor), at least one computer processor (e.g., a host server), and a non-transitory computer-readable storage medium. The storage medium can store computer executable instructions, which when executed by the compiler operating on the at least one computer processor, cause the at least one computer processor to be operable for performing the operations and techniques described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method, comprising:

partitioning, by a computing system comprising one or more computing devices, a machine learning model into a plurality of partitions for execution on a plurality of deterministic-timing processor devices each configured to perform operations at a predetermined time determined at a compile time by a compiler; and compiling, by the computing system, each of the plurality of partitions for execution on a corresponding deterministic-timing processor device of the plurality of deterministic-timing processor devices;

wherein partitioning the machine learning model comprises:

performing at least one horizontal slicing operation configured to assign a first tensor operation of the machine learning model to a first partition and a second tensor operation of the machine learning model to a second, different partition, while keeping each of the first tensor operation and second tensor operation intact; and performing at least one vertical slicing operation configured to divide the first tensor operation for execution on two or more deterministic-timing processor devices of the plurality of deterministic-timing processor devices.

2. The method of claim 1, further comprising:

determining, by the computing system, resource requirement data indicative of one or more resource requirements for each respective tensor operation of a plurality of tensor operations of the machine learning model, wherein partitioning is performed based at least in part on the resource requirement data.

3. The method of claim 2, wherein the one or more resource requirements comprise a number of memory addresses to be allocated to inputs and outputs of the respective tensor operation.

4. The method of claim 3, wherein the resource requirement data comprises data indicative of a number of memory addresses that will be unavailable for allocation to the inputs and outputs of the respective tensor operation.

5. The method of claim 4, wherein the number of memory addresses that will be unavailable for allocation to the inputs and outputs comprises a number of memory addresses allocated to intermediate values to be used by a following operation subsequent to the respective tensor operation.

6. The method of claim 1, further comprising generating, by the computing system, a graph representation of the machine learning model, wherein partitioning the machine learning model comprises partitioning the graph representation into a plurality of subgraphs.

7. The method of claim 6, further comprising compiling, by the computing system, the machine learning model from a first language to a second language representation, wherein the graph representation is generated based on the second language representation.

8. The method of claim 6, wherein partitioning the graph representation into the plurality of subgraphs comprises:

determining, for each respective node or edge of a plurality of nodes or edges of the graph representation, one or more resource usage values indicative of an amount of resources to be used to execute the respective node or edge; and partitioning the graph representation based at least in part on the one or more resource usage values such that a peak resource usage value for each of the plurality of subgraphs does not exceed a corresponding resource availability value.

9. The method of claim 8, further comprising selecting, by the computing system, the two or more deterministic-timing processor devices for execution of the first tensor operation based at least in part on a first peak resource usage value associated with the first tensor operation.

10. The method of claim 1, wherein the second partition comprises the second tensor operation and a third tensor operation configured to receive, as input, one or more outputs of the second tensor operation, and wherein compiling each of the plurality of partitions for execution comprises compiling one or more computer-executable instructions to cause a first deterministic-timing processor device of the plurality of deterministic-timing processor devices to execute at least a portion of the second tensor operation and at least a portion of the third tensor operation.

11. A computing system comprising one or more processors and one or more non-transitory computer-readable media storing instructions that are executable by one or more processors to cause the computing system to:

partition a machine learning model into a plurality of partitions for execution on a plurality of deterministic-timing processor devices each configured to perform operations at a predetermined time determined at a compile time by a compiler; and compile each of the plurality of partitions for execution on a corresponding deterministic-timing processor device of the plurality of deterministic-timing processor devices;

wherein partitioning the machine learning model comprises:

performing at least one horizontal slicing operation configured to assign a first tensor operation of the machine learning model to a first partition and a second tensor operation of the machine learning model to a second, different partition, while keeping each of the first tensor operation and second tensor operation intact; and performing at least one vertical slicing operation configured to divide the first tensor operation for execution on two or more deterministic-timing processor devices of the plurality of deterministic-timing processor devices.

12. The computing system of claim 11, wherein the instructions further cause the computing system to:

determine resource requirement data indicative of one or more resource requirements for each respective tensor operation of a plurality of tensor operations of the machine learning model, wherein partitioning is performed based at least in part on the resource requirement data.

13. The computing system of claim 12, wherein the one or more resource requirements comprise a number of memory addresses to be allocated to inputs and outputs of the respective tensor operation.

14. The computing system of claim 13, wherein the resource requirement data comprises data indicative of a number of memory addresses that will be unavailable for allocation to the inputs and outputs of the respective tensor operation.

15. The computing system of claim 14, wherein the number of memory addresses that will be unavailable for allocation to the inputs and outputs comprises a number of memory addresses allocated to intermediate values to be used by a following operation subsequent to the respective tensor operation.

16. The computing system of claim 11, wherein the instructions further cause the computing system to generate a graph representation of the machine learning model, wherein partitioning the machine learning model comprises partitioning the graph representation into a plurality of subgraphs.

17. The computing system of claim 16, wherein the instructions further cause the computing system to compile the machine learning model from a first language to a second language representation, wherein the graph representation is generated based on the second language representation.

18. The computing system of claim 16, wherein partitioning the graph representation into the plurality of subgraphs comprises:

determining, for each respective node or edge of a plurality of nodes or edges of the graph representation, one or more resource usage values indicative of an amount of resources to be used to execute the respective node or edge; and partitioning the graph representation based at least in part on the one or more resource usage values such that a peak resource usage value for each of the plurality of subgraphs does not exceed a corresponding resource availability value.

19. The computing system of claim 18, wherein the instructions further cause the computing system to select the two or more deterministic-timing processor devices for execution of the first tensor operation based at least in part on a first peak resource usage value associated with the first tensor operation.

20. One or more example non-transitory computer-readable media storing instructions that are executable by one or more processors to cause a computing system to:

partition a machine learning model into a plurality of partitions for execution on a plurality of deterministic-timing processor devices each configured to perform operations at a predetermined time determined at a compile time by a compiler; and compile each of the plurality of partitions for execution on a corresponding deterministic-timing processor device of the plurality of deterministic-timing processor devices;

wherein partitioning the machine learning model comprises:

performing at least one horizontal slicing operation configured to assign a first tensor operation of the machine learning model to a first partition and a second tensor operation of the machine learning model to a second, different partition, while keeping each of the first tensor operation and second tensor operation intact; and performing at least one vertical slicing operation configured to divide the first tensor operation for execution on two or more deterministic-timing processor devices of the plurality of deterministic-timing processor devices.

\* \* \* \* \*